US010738919B2

(12) United States Patent
Kishi et al.

(10) Patent No.: US 10,738,919 B2
(45) Date of Patent: Aug. 11, 2020

(54) SEALING MATERIAL AND JOINT

(71) Applicant: KUBOTA CORPORATION, Osaka (JP)

(72) Inventors: Shozo Kishi, Amagasaki (JP); Takaaki Kagawa, Amagasaki (JP); Keita Oda, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 77 days.

(21) Appl. No.: 15/987,246

(22) Filed: May 23, 2018

(65) Prior Publication Data

US 2018/0292033 A1 Oct. 11, 2018

Related U.S. Application Data

(62) Division of application No. 14/408,591, filed as application No. PCT/JP2013/066013 on Jun. 11, 2013, now Pat. No. 10,018,290.

(30) Foreign Application Priority Data

Jun. 25, 2012 (JP) ................................. 2012-141533
Jun. 25, 2012 (JP) ................................. 2012-141534

(51) Int. Cl.
*F16L 21/04* (2006.01)
*F16L 47/08* (2006.01)
(Continued)

(52) U.S. Cl.
CPC ............. *F16L 21/03* (2013.01); *F16J 15/022* (2013.01); *F16J 15/028* (2013.01); *F16K 3/30* (2013.01);
(Continued)

(58) Field of Classification Search
CPC ...... F16L 5/10; F16L 7/02; F16L 21/02; F16L 21/025; F16L 21/03; F16L 21/04;
(Continued)

(56) References Cited

U.S. PATENT DOCUMENTS 2,354,538 A 7/1944 Parker
2,735,700 A 2/1956 Bowan et al.
(Continued)

FOREIGN PATENT DOCUMENTS

CN 102301172 A 12/2011
DE 3803729 A1 * 8/1989 ............ F16L 17/032
(Continued)

OTHER PUBLICATIONS

Office Action issued in corresponding Indian Patent Application No. 3032/KOLNP/2014 dated Jun. 27, 2019.
(Continued)

*Primary Examiner* — Hailey K. Do
(74) *Attorney, Agent, or Firm* — Kusner & Jaffe

(57) ABSTRACT

A first projection is formed on the outer periphery of a bulb part, a second projection is formed on the socket rear end of the bulb part, a tapered part is formed with a decreasing diameter from the inner periphery of a heel part to the inner periphery of the second projection, and a third projection is formed on the tapered part. A first dimension B from the first projection to the third projection in an inclination direction opposite to an inclination direction G of the tapered part is smaller than a second dimension C from the first projection to the second projection in a radial direction A.

7 Claims, 27 Drawing Sheets

(51) Int. Cl.

| | |
|---|---|
| F16L 27/08 | (2006.01) |
| F16L 27/12 | (2006.01) |
| F16L 21/03 | (2006.01) |
| F16L 23/024 | (2006.01) |
| F16L 23/032 | (2006.01) |
| F16L 37/084 | (2006.01) |
| F16K 3/30 | (2006.01) |
| F16L 21/08 | (2006.01) |
| F16J 15/02 | (2006.01) |
| F16K 27/00 | (2006.01) |
| F16L 23/16 | (2006.01) |
| F16L 23/22 | (2006.01) |

(52) U.S. Cl.
CPC .............. *F16K 27/00* (2013.01); *F16L 21/04* (2013.01); *F16L 21/08* (2013.01); *F16L 23/024* (2013.01); *F16L 23/032* (2013.01); *F16L 37/0845* (2013.01); *F16L 47/08* (2013.01); *F16L 21/045* (2013.01); *F16L 23/162* (2013.01); *F16L 23/22* (2013.01); *F16L 27/0816* (2013.01); *F16L 27/125* (2013.01)

(58) Field of Classification Search
CPC ......... F16L 21/045; F16L 21/05; F16L 23/22; F16L 27/0816; F16L 27/125; F16L 37/0845; F16L 47/08
See application file for complete search history.

(56) References Cited

U.S. PATENT DOCUMENTS

| | | | |
|---|---|---|---|
| 3,547,471 A | 12/1970 | Dunmire | |
| 3,850,455 A | 11/1974 | Stafford | |
| 4,059,289 A | 11/1977 | Morris et al. | |
| 4,143,884 A | 3/1979 | Nicholas et al. | |
| 4,298,206 A | 11/1981 | Kojima | |
| 4,546,987 A | 10/1985 | Bucher et al. | |
| 5,058,907 A | 10/1991 | Percebois et al. | |
| 5,071,140 A | 12/1991 | Quevedo Del Rio | |
| 5,114,162 A * | 5/1992 | Ditcher | F16L 41/088 277/605 |
| 5,435,605 A * | 7/1995 | Koumatsu | F16L 17/025 277/648 |
| 6,126,173 A * | 10/2000 | Westhoff | F16L 5/10 277/615 |
| 6,168,210 B1 | 1/2001 | Bird | |
| 6,843,514 B2 | 1/2005 | Rex et al. | |
| 7,789,431 B2 | 9/2010 | Freudendahl | |
| 2011/0084484 A1 | 4/2011 | German et al. | |
| 2011/0278835 A1 | 11/2011 | Kishi et al. | |

FOREIGN PATENT DOCUMENTS

| | | |
|---|---|---|
| EP | 0140171 A1 | 5/1985 |
| EP | 0399940 A1 | 11/1990 |
| EP | 0406144 A1 | 1/1991 |
| EP | 0709612 A1 | 5/1996 |
| JP | 3-41264 A | 2/1991 |
| JP | 05-026384 A | 2/1993 |
| JP | 2003-240170 A | 8/2003 |
| JP | 2008-196607 A | 8/2008 |
| JP | 2008-297155 A | 12/2008 |
| JP | 2010-174906 A | 8/2010 |
| JP | 2010-286110 A | 12/2010 |
| JP | 2011-089528 A | 5/2011 |
| JP | 2011-099515 A | 5/2011 |
| JP | 4836870 B2 | 12/2011 |
| TW | 201043822 A1 | 12/2010 |

OTHER PUBLICATIONS

International Search Report from corresponding International Patent Application No. PCT/JP2013/066013 dated Sep. 3, 2013 (English-language translation provided).
European Search Report issued in corresponding European Patent Application No. 13809825.6 dated Jan. 21, 2016.
Office Action issued in corresponding Taiwanese Patent Application No. 104130438 dated Apr. 25, 2016.
Office Action issued in corresponding Australian Patent Application No. 2013282067 dated Sep. 12, 2016.
Office Action issued in related U.S. Appl. No. 14/408,591 dated Aug. 24, 2016.
Office Action issued in related U.S. Appl. No. 14/408,591 dated Feb. 6, 2017.
Office Action issued in related U.S. Appl. No. 14/408,591 dated Nov. 28, 2017.

* cited by examiner

SEALING MATERIAL AND JOINT

RELATED APPLICATIONS

This application is a divisional of U.S. application Ser. No. 14/408,591, filed on Dec. 17, 2014, which is a U.S. National Stage Application of International Application No. PCT/JP2013/066013, filed Jun. 11, 2013, which claims priority from Japanese Patent Application No. 2012-141533, filed Jun. 25, 2012, and Japanese Patent Application No. 2012-141534, filed Jun. 25, 2012, said patent applications hereby fully incorporated herein by reference.

FIELD OF THE INVENTION

The present invention relates to a sealing member used for a joint in which a spigot lies in a socket, the joint containing the sealing member, a pressing ring used for a joint, the joint including the pressing ring, and a valve connected to a pipe via the joint.

BACKGROUND OF THE INVENTION

As shown in FIG. 28, such a conventional sealing member is used for a separation preventive pipe joint 271 of a slip-on type. In the pipe joint 271, a spigot 275 formed on the end of a pipe 274 lies in a socket 273 formed on the end of a pipe 272 connected to the pipe 274.

A sealing member placement recess 276 is formed inside the socket 273 and contains a ring-shaped rubber sealing member 277. A lock ring groove 278 is formed behind the sealing member placement recess 276. A lock ring 279 is attached into the lock ring groove 278. An elastic member 280 for centering the lock ring 279 is disposed between the outer periphery of the lock ring 279 and the bottom of the lock ring groove 278. Moreover, a protrusion 281 is formed on the outer periphery of the end of the spigot 275 so as to be engaged with the lock ring 279 from the rear of the socket.

As shown in FIGS. 28 and 29, a fitting groove 282 is formed on an inner circumference 284 of the sealing member placement recess 276. The sealing member 277 includes a heel part 283 that is fit into and engaged with the fitting groove 282 and a bulb part 285 that is compressed between the inner circumference 284 and the outer circumference of the spigot 275 so as to generate a sealing surface pressure.

The bulb part 285 has first to third projections 286 to 288. The first projection 286 is formed on the outer circumference of the bulb part 285 so as to protrude outward in a radial direction A. The second projection 287 is formed on the socket rear end of the bulb part 285.

Moreover, the third projection 288 is formed on the inner circumference of the bulb part 285 so as to protrude inward in the radial direction A. The inside diameter of the third projection 288 is set to be smaller than the outside diameter of the spigot 275. Furthermore, a tapered part 289 is formed so as to gradually decrease in diameter from the inner circumference of the heel part 283 to the third projection 288.

With this configuration, as shown in FIG. 28, the heel part 283 is fit into the fitting groove 282 while the spigot 275 is inserted into the socket 273. This increases the diameter of the third projection 288 and holds the bulb part 285 between the inner circumference of the socket 273 and the outer circumference of the spigot 275. At this point, a clearance between the first projection 286 and the third projection 288 is compressed in the radial direction A.

The pipe joint 271 containing the sealing member 277 is described in, for example, Japanese Patent No. 4836870.

Another type of joint is, for example, a pipe joint 301 with a GX special pipe connecting cast-iron pipes as shown in FIG. 30. In the pipe joint 301, a spigot 305 formed on the end of a second pipe 304 is inserted into a socket 303 formed on the end of a first pipe 302 to be joined with the second pipe 304. A peripheral wall 306 radially protruding inward is formed all around the inner circumference of the rear part of the socket 303.

Moreover, from an opening end face 307 of the socket 303 to the peripheral wall 306, a sealing member insertion space 308 is formed between an outer circumference 305a of the spigot 305 and an inner circumference 303a of the socket 303 so as to surround the outer circumference 305a. An annular sealing member 309 for sealing between the outer circumference 305a of the spigot 305 and the inner circumference 303a of the socket 303 lies in the sealing member insertion space 308.

Furthermore, a lock ring groove 310 is formed behind the peripheral wall 306 so as to surround the spigot 305. The lock ring groove 310 is provided with a single lock ring 311 having one slit in its circumference. Moreover, a protrusion 312 is formed around the outer circumference of the end of the spigot 305 so as to be engaged with the lock ring 311 from the rear of the socket.

A pressing ring 313 is fit onto the spigot 305 and is opposed to the opening end face 307 of the socket 303 from the outside. The pressing ring 313 presses the sealing member 309 toward the rear of the socket 303. The pressing ring 313 is fastened to a flange 316 of the socket 303 with a plurality of T-head bolts 314 and nuts 315 and has a pressing face 317 in contact with the end of the sealing member 309 and a protrusion 318. The protrusion 318 that comes into contact with the opening end face 307 of the socket 303 keeps a distance A from the pressing face 317 to the opening end face 307 of the socket 303 at a predetermined distance.

With this configuration, when the pipes 302 and 304 are joined to each other, the lock ring 311 is first fit into the lock ring groove 310 and then the spigot 305 is inserted into the socket 303 until the protrusion 112 of the spigot 305 moves on the inner circumference of the lock ring 311 to the rear of the socket 303 with the sealing member 309 and the pressing ring 313 fit onto the spigot 305.

Subsequently, the sealing member 309 is inserted into the sealing member insertion space 308 from the opening end face 307 of the socket 303, and then the pressing ring 313 is fastened to the flange 316 of the socket 303 with the T-head bolts 314 and the nuts 315. At this point, the fastening of the nuts 315 moves the pressing ring 313 in a pressing direction B along a tube axis, allowing the pressing face 317 of the pressing ring 313 to press the sealing member 309 in the pressing direction B so as to press the sealing member 309 into the sealing member insertion space 308. After that, the protrusion 318 of the pressing ring 313 comes into contact with the opening end face 307 of the socket 303, preventing the pressing ring 313 from moving in the pressing direction B. At this point, the fastening of the nuts 315 is stopped to keep the distance A from the pressing face 317 of the pressing ring 313 to the opening end face 107 of the socket 303 at the predetermined distance. In this case, the rear end of the sealing member 309 does not reach the peripheral wall 306, forming a small space 320 between the rear end of the sealing member 309 and the peripheral wall 306.

When a region where the inner circumference 303a of the socket 303 and the outer circumference 305a of the spigot 305 are opposed in parallel to each other is defined as a compressed region C in the sealing member insertion space 308, the sealing member 309 is compressed in a radial direction D in the compressed region C. This keeps watertightness (sealing property) between the inner circumference 303a of the socket 303 and the outer circumference 305a of the spigot 305.

The pipe joint 301 including the pressing ring 313 is described in, for example, Japanese Patent Laid-Open No. 2010-286110.

SUMMARY OF THE INVENTION

In the related art configuration shown in FIGS. 28 and 29, however, when the pipes 272 and 274 are joined to each other, the clearance between the first projection 286 and the third projection 288 is compressed in the radial direction A while a first dimension B from the outer circumference of the first projection 286 to the inner circumference of the third projection 288 in the radial direction A is larger than a second dimension C from the outer circumference of the first projection 286 to the inner circumference of the second projection 287 in the radial direction A as shown in FIG. 29. Unfortunately, this increases a compressive force required for compressing the bulb part 285 in the radial direction A. The compressive force increased thus may raise a maximum insertion force required for inserting the spigot 275 into the socket 273.

In the other related art configuration shown in FIG. 30, a clearance E between the inner circumference 303a of the socket 303 and the outer circumference 305a of the spigot 305 is not kept constant but is slightly changed because of the manufacturing tolerances of the socket 303 and the spigot 305. Specifically, if the socket 303 has an inside diameter of a maximum manufacturing tolerance while the spigot 305 has an outside diameter of a minimum manufacturing tolerance, the clearance E is maximized. Conversely, if the socket 303 has an inside diameter of a minimum manufacturing tolerance while the spigot 305 has an outside diameter of a maximum manufacturing tolerance, the clearance E is minimized.

In order to keep sufficient watertightness when the clearance E is large, the volume of the sealing member 309 needs to be increased to reliably compress the sealing member 309 in the compressed region C.

However, when the volume of the sealing member 309 is increased with the small clearance E as shown in FIG. 31, the rear end of the sealing member 309 reaches the peripheral wall 306 before the protrusion 318 of the pressing ring 313 comes into contact with the opening end face 107 of the socket 303. This eliminates a space for the sealing member 309 to escape such that the sealing member 309 cannot be pressed into the sealing member insertion space 308 any more.

In this case, an operator cannot visually confirm from the outside that the rear end of the sealing member 309 has reached the peripheral wall 306. Thus, the operator may forcibly fasten the nuts 315 to bring the protrusion 318 of the pressing ring 313 into contact with the opening end face 307 of the socket 303. This may apply an extremely large force (excessive force) to the sealing member 309 or the pressing ring 313, failing to join the pipes 302 and 304 to each other.

To address this problem, the compressed region C may be extended to the rear of the socket 303 along the tube axis according to an increase in the volume of the sealing member 309. As the compressed region C is extended, the socket 303 is made longer than that of the related art and thus the spigot 305 needs to be extended accordingly. Unfortunately, this may increase the mass of the pipes 302 and 304.

An object of the present invention is to provide a sealing member and a joint that can reduce a maximum insertion force required for inserting a spigot into a socket and improve watertightness between the socket and the spigot. Another object of the present invention is to provide a pressing ring, a joint, and a valve that can smoothly join passage forming members such as pipes while bringing the contact part of the pressing ring into contact with the socket, and suppress extension of the socket.

In order to attain the objects, a first invention is an annular sealing member made of an elastic material used for a joint in which a spigot formed on the end of a pipe lies in a socket formed on the end of a pipe to be connected to the other pipe, the sealing member having a heel part fit into a fitting part formed in the socket, and a bulb part disposed between the inner circumference of the socket and the outer circumference of the spigot, the bulb part having first to third projections, the first projection being formed on the outer periphery of the bulb part so as to protrude outward in a radial direction, the second projection being formed on the socket rear end of the bulb part, the bulb part having a tapered part that decreases in diameter from the inner periphery of the heel part to the inner periphery of the second projection, the third projection being formed on the tapered part so as to protrude inward in the radial direction, the third projection being disposed between the heel part and the second projection in a tube axial direction, the third projection having an inside diameter smaller than the outside diameter of the spigot and larger than the inside diameter of the second projection, the sealing member having a first dimension from the first projection to the third projection in an inclination direction opposite to the inclination direction of the tapered part, the first dimension being smaller than a second dimension from the outer periphery of the first projection to the inner periphery of the second projection in the radial direction, wherein if the bulb part is held between the inner circumference of the socket and the outer circumference of the spigot lying in the socket, the second projection increases in diameter and a portion between the first projection and the third projection is compressed in the radial direction so as to keep watertightness between the socket and the spigot.

With this configuration, the heel part of the sealing member is fit into the fitting part in the socket to insert the spigot into the socket. At this point, the end of the spigot comes into contact with the third projection of the sealing member to press the third projection in the rearward direction of the socket. This increases the diameter of the second projection and draws the third projection in the rearward direction of the socket. Thus, a tensile force is generated on the bulb part in the tube axial direction so as to extend the bulb part in the socket rearward direction, thereby reducing the first dimension and the compression margin (compression amount) of the bulb part in the radial direction.

After that, the end of the spigot compresses the bulb part of the sealing member while passing through the third projection. At this point, the portion between the first projection and the third projection is compressed in the radial direction. In this case, the sealing member has the first dimension between the first projection and the third projection such that the first dimension is smaller than the second dimension from the outer periphery of the first projection to the inner periphery of the second projection. Thus, the compression margin of the bulb part decreases in the radial direction so as to reduce a maximum insertion force.

Moreover, between the inner circumference of the socket and the outer circumference of the spigot, the portion between the first projection and the third projection is compressed in the radial direction so as to keep watertightness between the socket and the spigot. This can improve the watertightness between the socket and the spigot.

A sealing member of a second invention has a recess between the heel part and the first projection and a recess between the heel part and the third projection.

This configuration reduces a tensile force generated on the bulb part when the spigot is inserted into the socket and the third projection is pressed by the end of the spigot in the rearward direction of the socket, thereby easily increasing the diameter of the second projection. Thus, the protrusion formed on the end of the spigot can easily pass through the bulb part in the rearward direction of the socket, thereby reducing an insertion force during the joining of the pipes.

A third invention is a joint including the sealing member according to the first or second invention, wherein the heel part of the sealing member is fit into the fitting part in the socket, the spigot is inserted into the socket, and the bulb part of the sealing member is disposed between the inner circumference of the socket and the outer circumference of the spigot.

A fourth invention is a pressing ring in which a spigot formed on a second passage forming member is inserted into a socket fanned on a first passage forming member to be joined to the second passage forming member, a peripheral wall protruding inward in a radial direction is formed on the inner periphery of the rear of the socket, and a sealing member insertion space between an opening end face and a peripheral wall of the socket is formed between the outer circumference of the spigot and the inner circumference of the socket, the pressing ring being used for a joint including an annular sealing member lying in the sealing member insertion space, the pressing ring being opposed to the opening end face of the socket from the outside while being fit onto the spigot, the pressing ring being moved by a pressing member along the axis of the passage forming member in a pressing direction so as to press the sealing member into the sealing member insertion space, the pressing ring having a pressing face that comes into contact with the end of the sealing member, contact portions that come into contact with the socket so as to keep a distance from the pressing face to the opening end face of the socket at a predetermined distance, and an escaping portion that allows escape of a part of the sealing member pressed by the pressing face.

With this configuration, when the passage forming members are joined to each other, the spigot is inserted into the socket with the sealing member and the pressing ring fit onto the spigot. Subsequently, the sealing member is inserted into the sealing member insertion space from the opening end face of the socket, and the pressing ring is moved in the pressing direction by the pressing member. Thus, the pressing face of the pressing ring presses the sealing member in the pressing direction into the sealing member insertion space.

Moreover, the contact portions of the pressing ring are brought into contact with the socket so as to prevent the pressing ring from moving in the pressing direction. This keeps the distance from the pressing face of the pressing ring to the opening end face of the socket at the predetermined distance. Thus, the sealing member is compressed in the radial direction in the sealing member insertion space, keeping watertightness between the inner circumference of the socket and the outer circumference of the spigot.

Furthermore, a clearance between the inner circumference of the socket and the outer circumference of the spigot decreases, and the rear end of the sealing member reaches the peripheral wall before the contact portions of the pressing ring come into contact with the socket. Thus, the sealing member cannot be pressed into the sealing member insertion space any more. Even in this case, the pressing ring is continuously moved in the pressing direction by the pressing member, allowing a part of the sealing member pressed by the pressing face of the pressing ring to escape into the escaping portion. This can smoothly bring the contact portions of the pressing ring into contact with the socket. Without applying an extremely large force (excessive force) to the sealing member and the pressing ring, the passage forming members can be smoothly joined to each other and extension of the socket can be suppressed.

According to the pressing ring of a fifth invention, the escaping portion is a recessed portion that is opened near the opening end face of the socket opposed to the escaping portion, and the escaping portion is circumferentially formed outside the pressing face in the radial direction and is recessed from the pressing face in the drawing direction of the spigot.

With this configuration, even in the case of a small clearance between the inner circumference of the socket and the outer circumference of the spigot, the sealing member pressed by the pressing face of the pressing ring partially enters the escaping portion so as to smoothly bring the contact portions of the pressing ring into contact with the socket.

According to the pressing ring of a sixth invention, the escaping portion has a centering portion that guides the pressing ring in the radial direction so as to align the center of the pressing ring with the axis of the passage forming member.

With this configuration, when the pressing ring is moved in the pressing direction by the pressing member, the pressing ring is guided in the radial direction by the centering portion of the escaping portion and the center of the pressing ring is aligned with the axis of the passage forming member, thereby centering the pressing ring. This does not require an operator to lift the pressing ring in the radial direction when centering the pressing ring.

According to the pressing ring of a seventh invention, the escaping portion has an inner side-wall face and an outer side-wall face serving as the centering portion, the inner side-wall face and the outer side-wall face are opposed to each other in the radial direction, the outer side-wall face inclines with a decreasing diameter toward the rear of the escaping portion, and the outer side-wall face is in sliding contact with the end of the sealing member so as to guide the pressing ring in the radial direction.

With this configuration, when the pressing ring is moved in the pressing direction by the pressing member, the outer side-wall face of the escaping portion is in sliding contact with the end of the sealing member so as to guide the pressing ring in the radial direction, aligning the center of the pressing ring with the axis of the passage forming member.

An eighth invention is a joint including the pressing ring according to any one of the fourth to seventh inventions, wherein the first and second passage forming members are pipes, the pressing ring is opposed to the opening end face of the socket from the outside while being fit onto the spigot, and the pressing ring is moved by the pressing member along a tube axis in the pressing direction so as to press the sealing member into the sealing member insertion space until the contact portions come into contact with the socket.

With this configuration, the contact portions of the pressing ring are brought into contact with the socket so as to smoothly join the pipes and suppress extension of the socket. Accordingly, extension of the spigot and an increase in the mass of the pipe are suppressed.

A ninth invention is a joint including the pressing ring according to any one of the fourth to seventh inventions, wherein one of the first and second passage forming members is a valve and the other of the passage forming members is a pipe, the pressing ring is opposed to the opening end face of the socket from the outside while being fit onto the spigot, and the pressing ring is moved by the pressing member along the tube axis in the pressing direction so as to press the sealing member into the sealing member insertion space until the contact portions come into contact with the socket.

With this configuration, the contact portions of the pressing ring are brought into contact with the socket so as to smoothly join the valve and the pipe and suppress extension of the socket. Accordingly, extension of the spigot and an increase in the mass of the pipe or the valve are suppressed.

A tenth invention is a valve connected to a pipe via the joint according to the ninth invention, the valve including a valve casing and a valve body that opens and closes a passage formed in the valve casing, the valve casing including at least one of the socket and the spigot.

As has been discussed, the present invention can reduce a maximum insertion force required for inserting a spigot into a socket and improve watertightness between the socket and the spigot.

Moreover, the present invention can bring the contact portions of a pressing ring into contact with the socket so as to smoothly join pipes and suppress extension of the socket. Accordingly, extension of the spigot and an increase in the mass of the pipe or a valve are suppressed.

DETAILED DESCRIPTION OF THE PREFERRED EMBODIMENTS

Embodiments of the present invention will be described below with reference to the accompanying drawings.

First Embodiment

Figure 1:
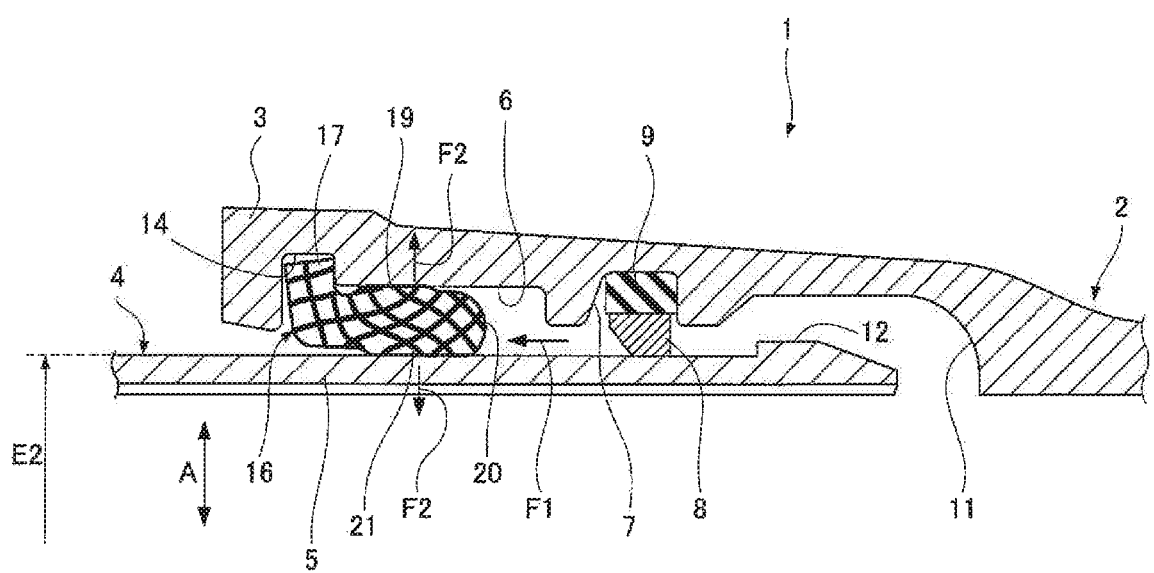
FIG. 1 is a cross-sectional view showing the structure of a pipe joint including a sealing member according to a first embodiment of the present invention.

In a first embodiment, as shown in FIG. 1, reference numeral 1 denotes a separation preventive pipe joint of a push-on type. A spigot 5 formed on the end of a pipe 4 lies in a socket 3 formed on the end of another pipe 2 connected to the pipe 4.

A sealing member placement recess 6 and a lock ring groove 7 disposed behind the sealing member placement recess 6 are formed all around the inner circumference of the socket 3. A lock ring 8 having one slit in its circumference is attached to the lock ring groove 7. An elastic biasing member 9 such as a rubber band for fixing the lock ring 8 is disposed between the outer circumference of the lock ring 8 and the bottom of the lock ring groove 7. Moreover, a rear end face 11 is formed in a radial direction A in the socket 3 so as to be located between the lock ring groove 7 and the rear of the socket 3. Furthermore, the spigot 5 has a protrusion 12 all around the outer circumference of the end of the spigot 5 such that the protrusion 12 can be engaged with the lock ring 8 from the rear of the socket.

A fitting groove 14 (an example of a fitting part) is formed all around the inner circumference of the sealing member placement recess 6. A clearance between the socket 3 and the spigot 5 is circumferentially sealed with an annular sealing member 16 made of rubber (an example of an elastic material). The sealing member 16 is configured as follows.

Figure 2:
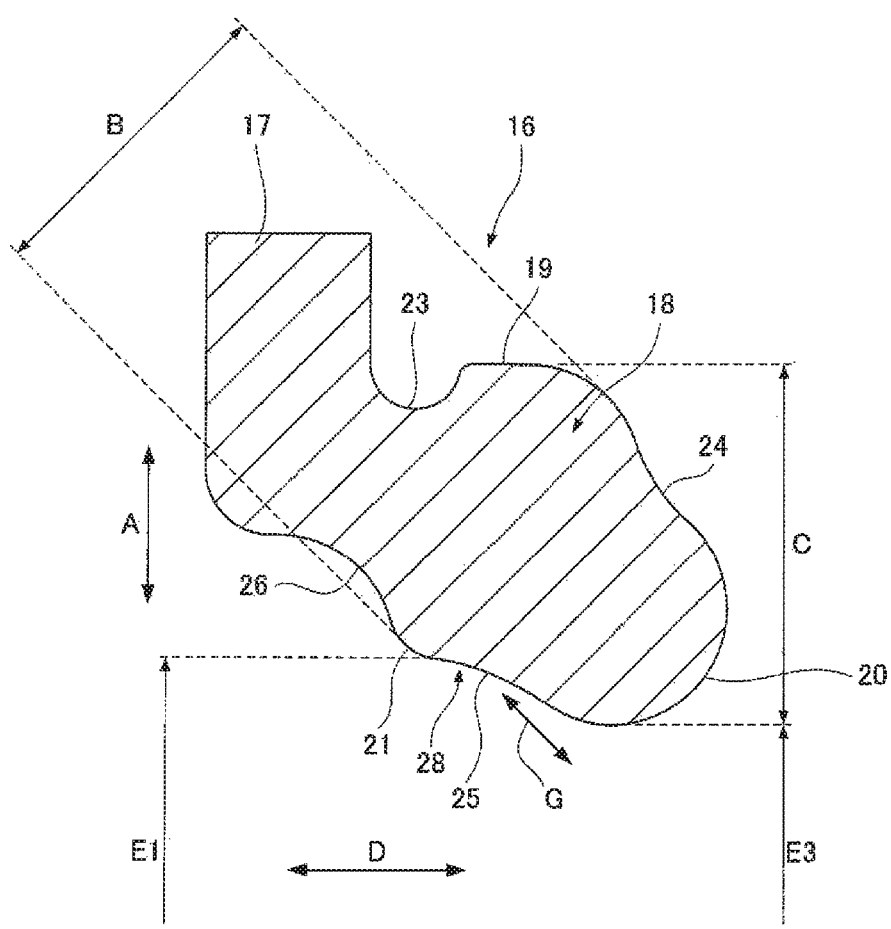
FIG. 2 shows a cross-sectional structure of the unattached sealing member alone to be provided in the pipe joint.

FIG. 2 is a cross-sectional view showing the structure of the sealing member 16 alone that is not attached to the pipe joint 1. The sealing member 16 has a heel part 17 fit into the fitting groove 14 and a bulb part 18 held between the inner circumference of the socket 3 (the inner circumference of the sealing member placement recess 6) and the outer circumference of the spigot 5. The heel part 17 is an annular member that is rectangular in cross section (perpendicular to a circumferential direction in cross section).

The bulb part 18 is an annular member that has first to third bulbs 19 to 21 (examples of first to third projections) and first to fourth recesses 23 to 26. In this configuration, the first bulb 19 has a curved shape that is formed all around the outer periphery of the bulb part 18 so as to protrude outward in the radial direction A.

The second bulb 20 has a curved shape that is formed all around the socket rear end of the bulb part 18 so as to protrude diagonally to the center of the pipe. The bulb part 18 has a tapered part 28 that is formed all around the bulb part 18 so as to gradually decrease in diameter from the inner periphery of the heel part 17 to the inner periphery of the second bulb 20.

The third bulb 21 has a curved shape that is formed all around the tapered part 28 so as to protrude inward in the radial direction A. The third bulb 21 is located between the heel part 17 and the second bulb 20 in a tube axial direction D. An inside diameter E1 of the third bulb 21 is smaller than an outside diameter E2 of the spigot 5 and is larger than an inside diameter E3 of the second bulb 20.

A first dimension B from the first bulb 19 to the third bulb 21 in an inclination direction (specifically, a direction that inclines toward the center of the pipe at the front of the socket 3) opposite to an inclination direction G of the tapered part 28 is smaller than a second dimension C from the outer periphery of the first bulb 19 to the inner periphery of the second bulb 20 in the radial direction A.

The first to fourth recesses 23 to 26 all have curved shapes that are formed all around the bulb part 18. In this configuration, the first recess 23 is formed between the heel part 17 and the first bulb 19, the second recess 24 is formed between the first bulb 19 and the second bulb 20, the third recess 25 is formed between the second bulb 20 and the third bulb 21, and the fourth recess 26 is formed between the third bulb 21 and the heel part 17.

The operations of the configuration will be described below.

Referring to FIGS. 3A, 3B, 3C, and 3D, the steps of joining the pipes 2 and 4 will be described below.

Figure 3A:
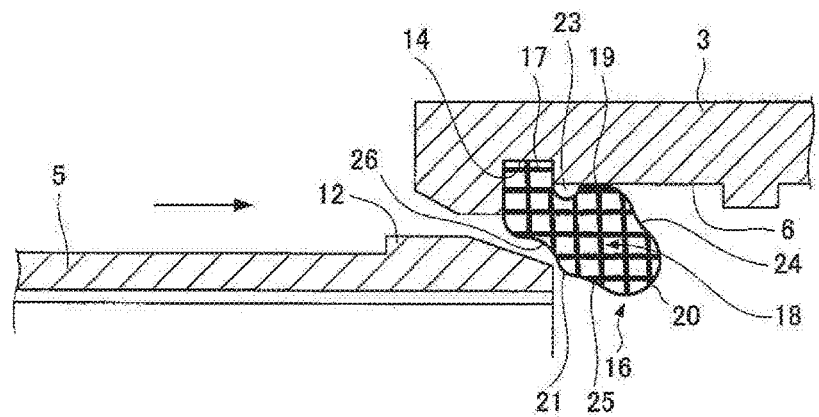
FIGS. 3A, 3B, 3C and 3D show cross-sectional views of pipes joined with the pipe joint.

(1) The lock ring 8 and the elastic biasing member 9 are fit into the lock ring groove 7, and then the heel part 17 of the sealing member 16 is fit into the fitting groove 14 as shown in FIG. 3A, so that the lock ring 8, the elastic biasing member 9, and the sealing member 16 are attached into the socket 3.

Figure 3B:
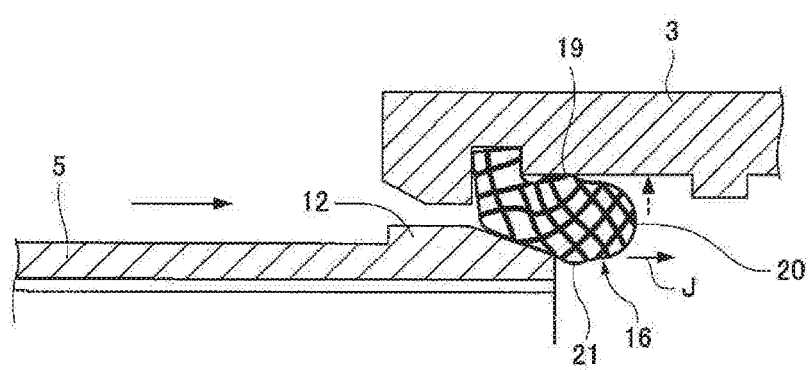

(2) The spigot 5 is inserted into the socket 3. At this point, as shown in FIG. 3B, the end of the spigot 5 comes into contact with the third bulb 21 of the sealing member 16 so as to press the third bulb 21 in a rearward direction J of the socket. This increases the diameter of the second bulb 20 and draws the third bulb 21 in the rearward direction J of the socket. Thus, a tensile force is generated on the bulb part 18 in the tube axial direction D so as to extend the bulb part 18 in the socket rearward direction J, thereby reducing the first dimension B (See FIG. 2) and the compression margin of the bulb part 18 in the radial direction A.

The formation of the first and fourth recesses 23 and 26 reduces a tensile force generated on the bulb part 18 when the end of the spigot 5 presses the third bulb 21 in the rearward direction J of the socket, thereby easily increasing the diameter of the second bulb 20. Thus, the protrusion 12 of the spigot 5 can easily pass through the bulb part 18 in the rearward direction J of the socket, thereby reducing an insertion force during the joining of the pipes.

Figure 3C:
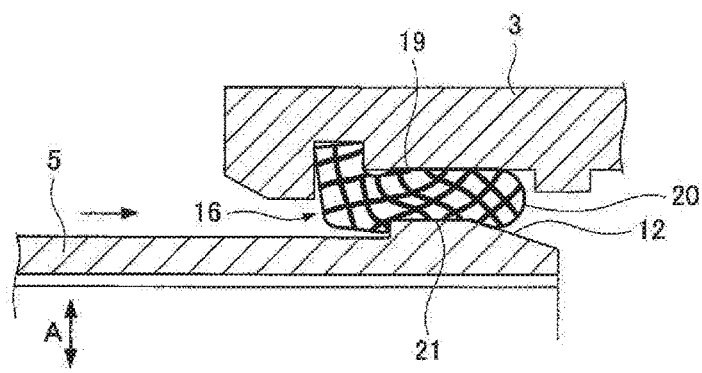

(3) After that, as shown in FIG. 3C, the protrusion 12 of the spigot 5 compresses the bulb part 18 in the radial direction A while passing through the inside of the third bulb 21. At this point, the positional relationship among the first to third bulbs 19 to 21 is close to a triangle whose apex is the third valve 21 in the socket 3 in the radial direction A. A clearance between the first bulb 19 and the third bulb 21 is compressed in the radial direction A.

In a state in which the sealing member 16 is not compressed or deformed before the spigot 5 is inserted into the socket 3, as shown in FIG. 2, the first dimension B is smaller than the second dimension C. Therefore, when the spigot 5 is inserted into the socket 3 to compress and deform the bulb part 18 of the sealing member 16, the compression margin (compression amount) of the bulb part 18 is reduced.

Figure 3D:
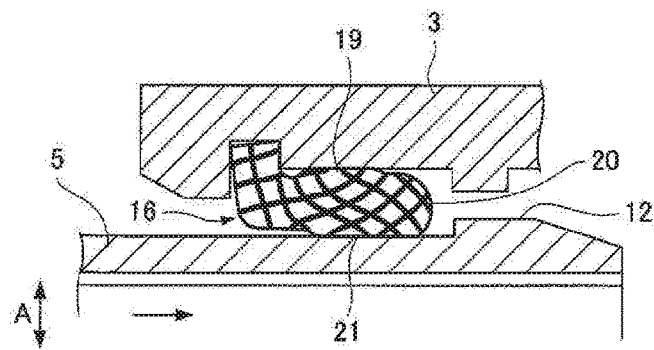

(4) As shown in FIG. 3D, even after the protrusion 12 of the spigot 5 passes through the inside of the third bulb 21, the clearance between the first bulb 19 and the third bulb 21 is compressed in the radial direction A. Thus, as in the joining step (3), the compression margin of the bulb part 18 is reduced so as to reduce a maximum insertion force.

(5) After that, as shown in FIG. 1, the protrusion 12 of the spigot 5 passes through the inside of the lock ring 8 to the rear of the socket, thereby joining the pipes 2 and 4.

The pipes 2 and 4 are joined thus. In this state, the clearance between the first bulb 19 and the third bulb 21 is compressed in the radial direction A between the inner circumference of the socket 3 (the inner circumference of the sealing member placement recess 6) and the outer circumference of the spigot 5 so as to keep watertightness between the socket 3 and the spigot 5. This can improve the watertightness between the socket 3 and the spigot 5.

As shown in FIG. 1, when a water pressure (fluid pressure) is applied into the joined pipes 2 and 4, an extrusion force F1 that extrudes the sealing member 16 from the inside to the outside is applied to the second bulb 20. At this point, the third bulb 21 is pressed to the outer circumference of the spigot 5 and thus prevents the extrusion of the second bulb 20. When the extrusion of the second bulb 20 is prevented thus, an extrusion force F2 proportionate to the extrusion force F1 is generated in the radial direction A on the bulb part 18 by a self-sealing effect, thereby further increasing the watertightness.

Figure 4:
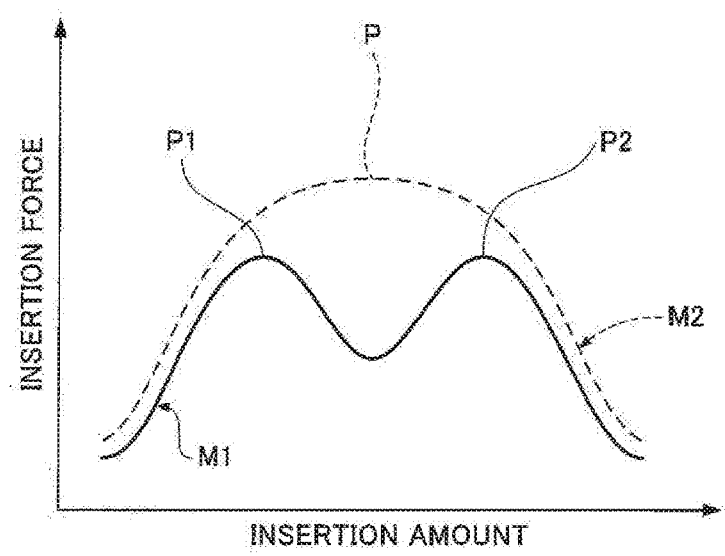
FIG. 4 is a graph showing the relationship between an insertion amount and insertion force of a spigot relative to a socket in the pipe joint.

FIG. 4 is a graph showing the relationship between an insertion amount and an insertion force of the spigot 5 relative to the socket 3. In FIG. 4, a graph M1 indicated by a solid line corresponds to the first embodiment and has two peaks P1 and P2 having a maximum insertion force. The first insertion force peak P1 appears when the bulb part 18 is extended in the rearward direction J of the socket by pressing the third bulb 21 with the end of the spigot 5 in the rearward direction J of the socket in the joining step (2) of FIG. 3B. After that, the second insertion force peak P2 appears when the bulb part 18 is compressed in the radial direction A by passing the protrusion 12 of the spigot 5 through the inside of the third bulb 21 in the joining step (3) of FIG. 3C.

In the first embodiment, when the spigot 5 is inserted into the socket 3, the bulb part 18 is extended mainly in the rearward direction J of the socket and the bulb part 18 is compressed mainly in the radial direction A at different times according to the insertion amount of the spigot 5. The insertion force of the spigot 5 to the socket 3 is thus dispersed to the two peaks P1 and P2, thereby decreased.

Figure 28:
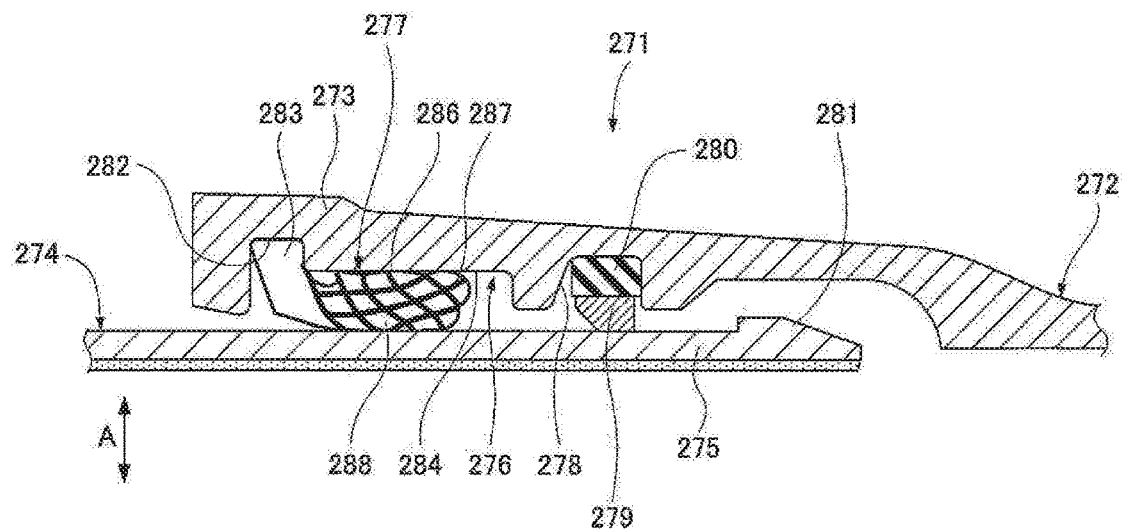
FIG. 28 is a cross-sectional view showing the structure of a pipe joint including a sealing member according to the related art.
Figure 29:
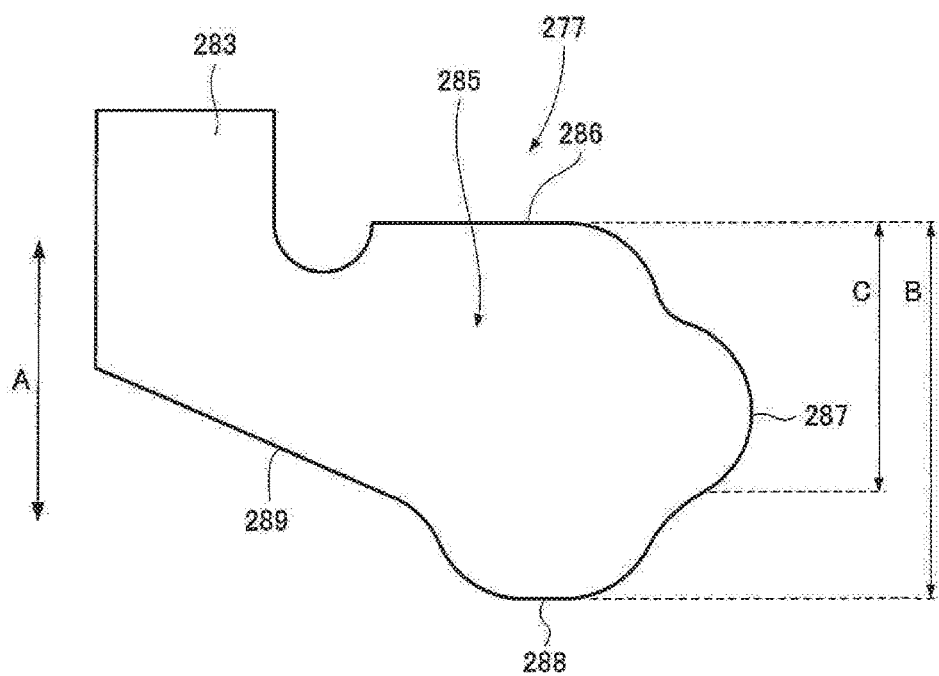
FIG. 29 shows a cross-sectional structure of the unattached sealing member alone to be provided in the pipe joint of FIG. 28.
Figure 30:
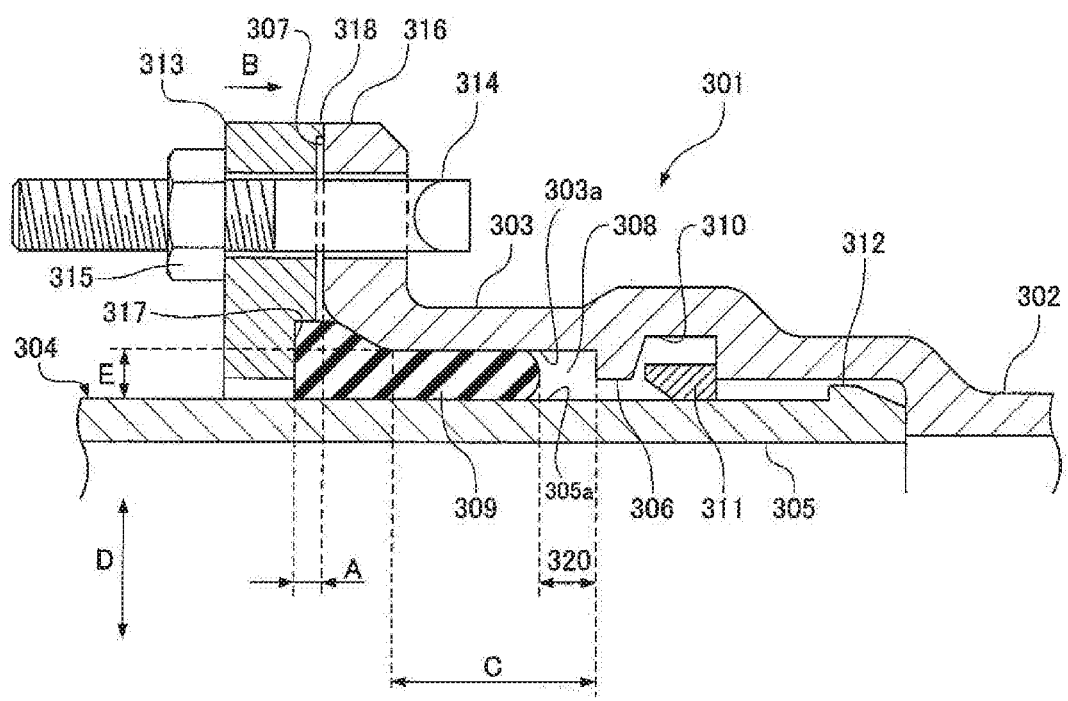
FIG. 30 is a cross-sectional view showing a pipe joint including a pressing ring according to another related art configuration.
Figure 31:
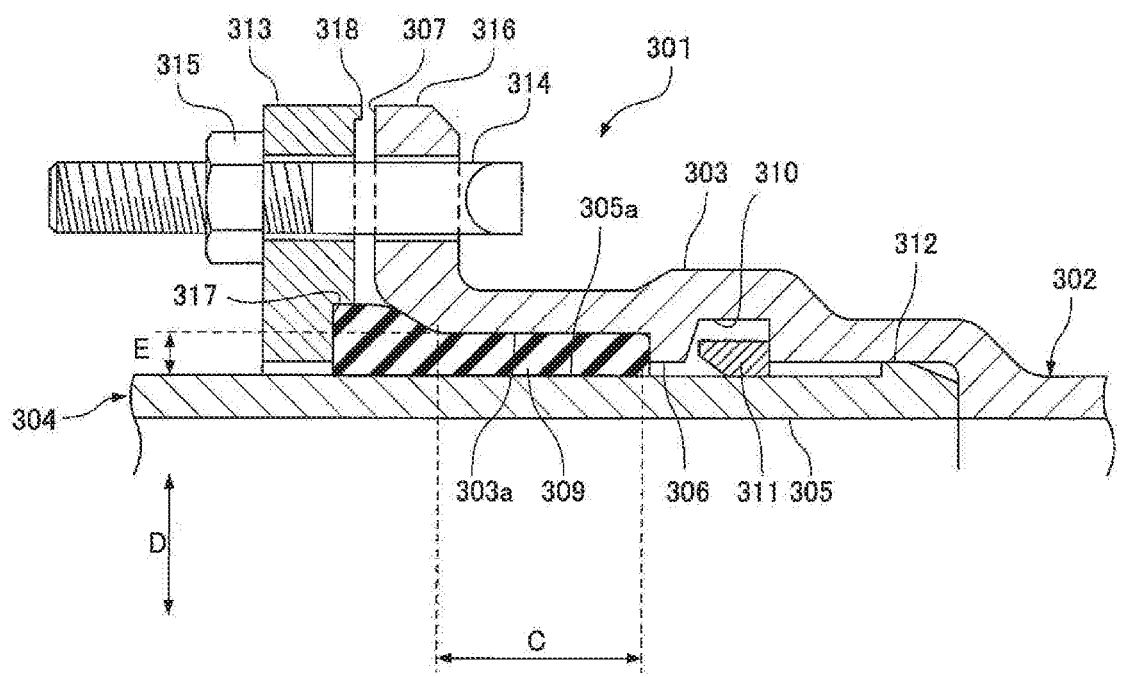
FIG. 31 is a cross-sectional view showing the structure of the pipe joint of FIG. 30 with a small clearance between a socket and a spigot.

In contrast, a second graph M2 indicated by a dotted line corresponds to the related art shown in FIGS. 28 and 29 with a single peak P. According to the related art, when the spigot 275 is inserted into the socket 273, the bulb part 285 is extended mainly in the rearward direction of the socket and the bulb part 285 is compressed mainly in the radial direction A substantially at the same time according to the insertion amount of the spigot 275. Thus, the insertion force of the spigot 5 to the socket 3 is not dispersed but is concentrated on the peak P, thereby increased.

Figure 5:
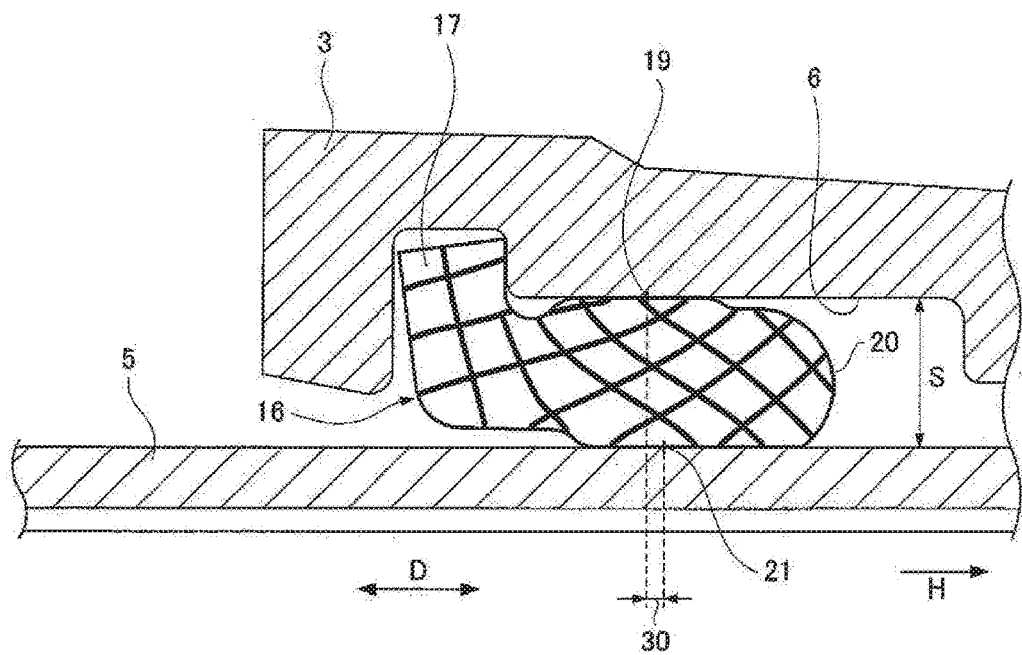
FIG. 5 is an enlarged cross-sectional view of the compressed and deformed sealing member with the pipes joined with the pipe joint.

In the explanation, as shown in FIG. 5, a clearance S between the inner periphery of the socket 3 and the outer periphery of the spigot 5 is a standard clearance (that is, the clearance S has a specified dimension). In this case, the position of the third bulb 21 is hardly displaced from the position of the first bulb 19 in an insertion direction H, resulting in only a small displacement 30 between the position of the first bulb 19 and the position of the third bulb 21 in the tube axial direction D.

Figure 6A:
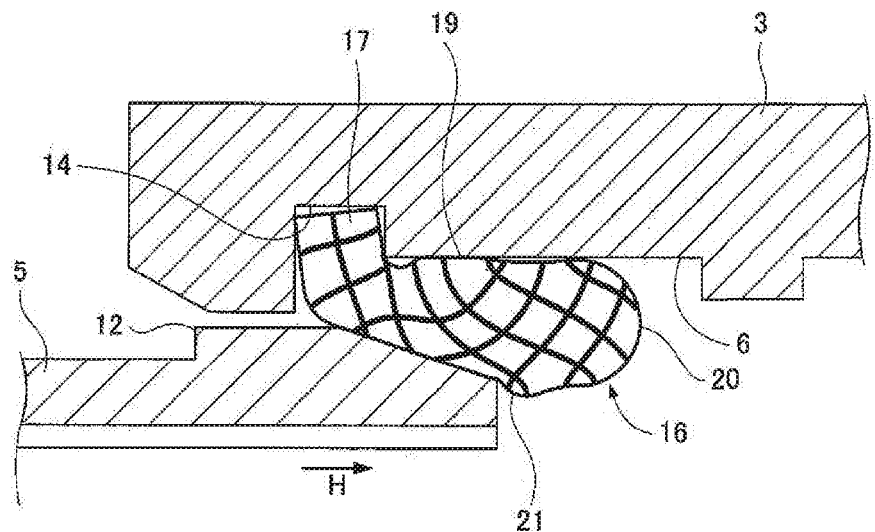
FIGS. 6A and 6B show cross-sectional views of the pipes with a minimum clearance between the socket and the spigot of the pipe joint.
Figure 6B:
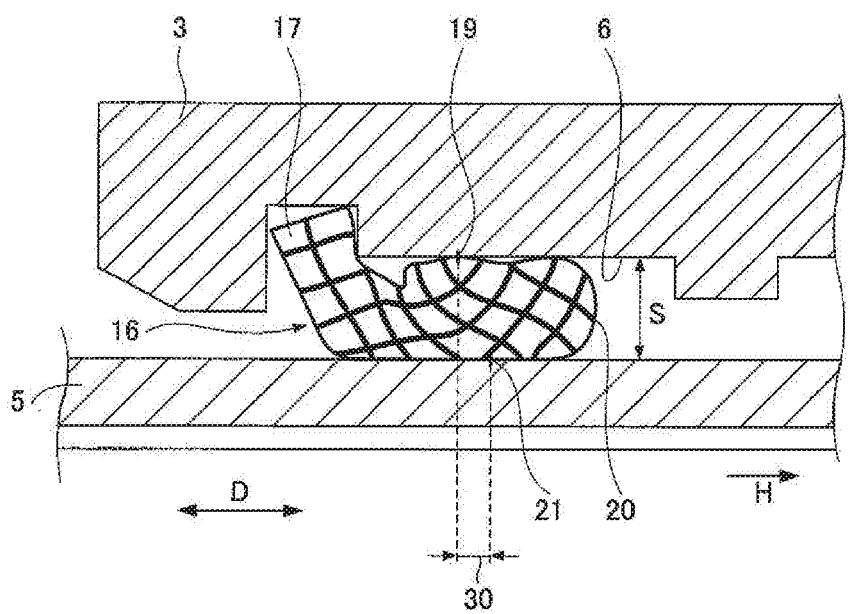

In contrast, if the socket 3 has an inside diameter of a minimum manufacturing tolerance and the spigot 5 has an outside diameter of a maximum manufacturing tolerance, as shown in FIG. 6B, the clearance S is minimized. In the case of the minimum clearance S, an engagement margin (engagement amount) between the third bulb 21 and the end of the spigot 5 increases. Thus, as compared with the case of the standard clearance S shown in FIG. 5, the third bulb 21 is further drawn into the rear part of the socket 3. This further reduces the first dimension B (See FIG. 2) compared to that of the standard clearance S, causing the bulb part 18 to have a smaller compression margin in the radial direction A.

When the pipes 2 and 4 are joined, the clearance between the first bulb 19 and the third bulb 21 is compressed in the radial direction A, thereby reducing the compression margin of the bulb part 18 and the maximum insertion force.

As shown in FIG. 6B, in the case of the minimum clearance S, the third bulb 21 is further drawn into the rear part of the socket 3. This displaces the position of the third bulb 21 from the position of the first bulb 19 in the insertion direction H, causing the displacement 30 between the position of the first bulb 19 and the position of the third bulb 21 in the tube axial direction D to be larger than the displacement 30 of the standard clearance S. In this case, the compression margin of the bulb part 18 in the radial direction A decreases and thus the insertion force of the spigot 5 with the minimum clearance S is considerably smaller than in the related art shown in FIGS. 28 and 29.

Figure 7A:
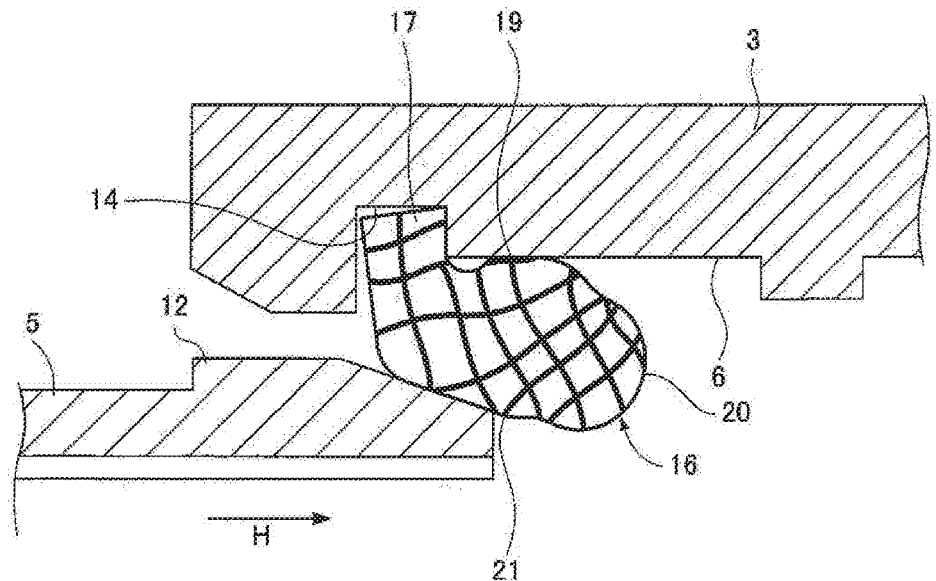
FIGS. 7A and 7B show cross-sectional views of the pipes with a maximum clearance between the socket and the spigot of the pipe joint.
Figure 7B:
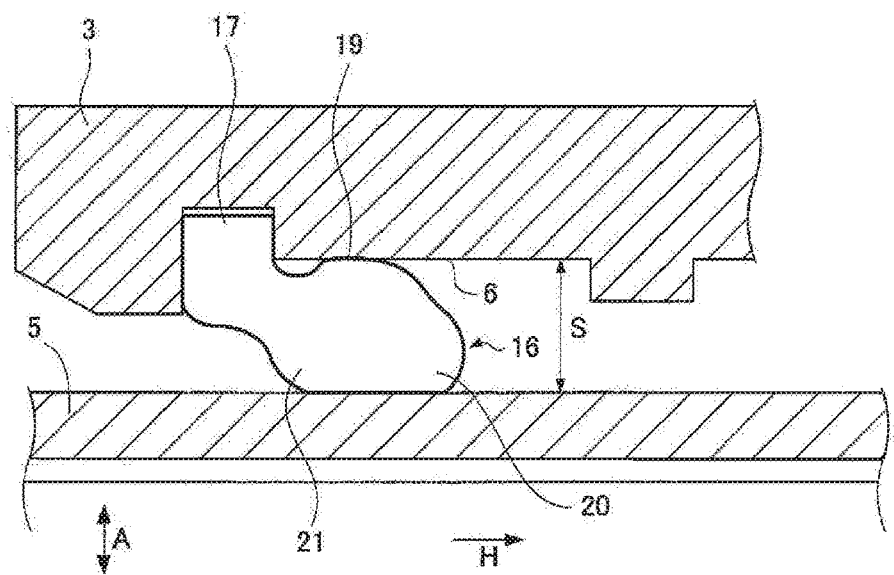

If the socket 3 has an inside diameter of the maximum manufacturing tolerance while the spigot 5 has an outside diameter of the minimum manufacturing tolerance, as shown in FIG. 7B, the clearance S is maximized. In the case of the maximum clearance S, the diameter of the second bulb 20 is increased by the spigot 5 when the pipes 2 and 4 are joined. At this point, an increase in the diameter of the second bulb 20 is smaller than that of the standard clearance S. As shown in FIG. 7B, the first bulb 19 comes into contact with the inner circumference of the socket 3 while the second bulb 20 and the third bulb 21 come into contact with the outer circumference of the spigot 5. In this state, a portion between the first bulb 19 and the second and third bulbs 20 and 21 is compressed in the radial direction A, thereby obtaining watertightness between the socket 3 and the spigot 5.

Figure 8:
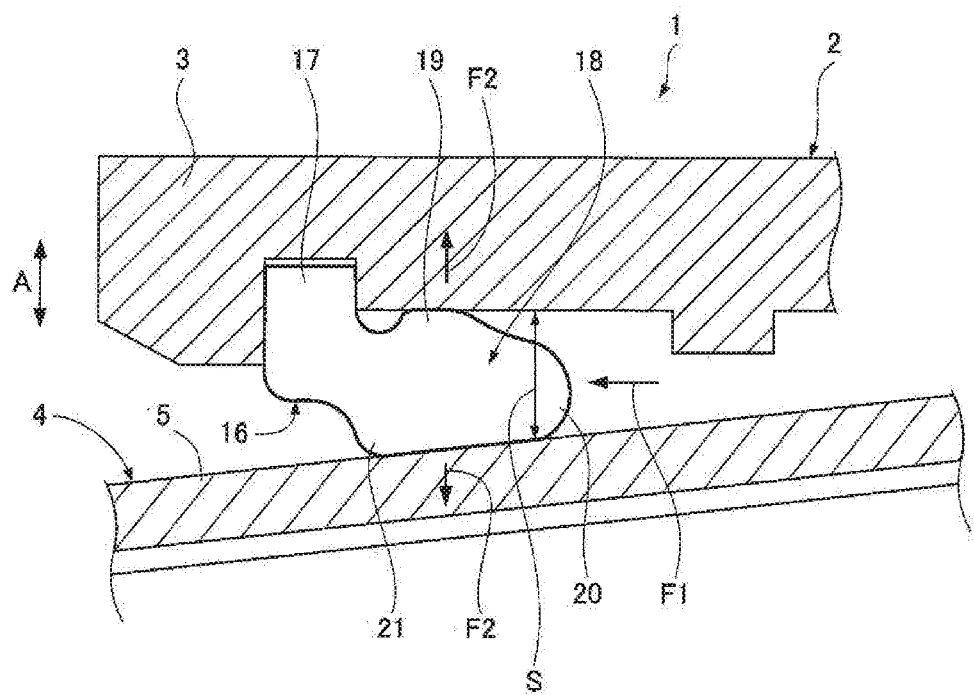
FIG. 8 is a partially enlarged cross-sectional view of the pipe joint with the spigot inclined with respect to the socket by an external force such as an earthquake.

Moreover, an external force applied to the pipe joint 1 and the pipes 2 and 4 by an earthquake or the like may bend the pipe joint 1 or flatten the pipes 2 and 4. For example, as shown in FIG. 8, even if the spigot 5 is inclined with respect to the socket 3, the first bulb 19 comes into contact with the inner circumference of the socket 3 and the third bulb 21 comes into contact with the outer circumference of the spigot 5. In this state, a water pressure applied into the pipes 2 and 4 causes the extrusion force F1 to be applied to the second bulb 20 so as to deform the bulb part 18. Furthermore, the extrusion force F2 proportionate to the extrusion force F1 is generated in the radial direction A on the bulb part 18 by the self-sealing effect, thereby further increasing the watertightness.

As shown in FIG. 8, even if the spigot 5 is inclined with respect to the socket 3 such that the clearance S between the inner periphery of the socket 3 and the outer periphery of the spigot 5 increases from the rear of the socket 3 toward the opening end of the socket 3, the third bulb 21 is reliably pressed to the outer circumference of the spigot 5 by the inward extrusion force F2 in the radial direction, thereby preventing insufficient provision of watertightness between the third bulb 21 and the outer circumference of the spigot 5.

Typically, as the pipes 2 and 4 increase in diameter, the spigot 5 decreases in stiffness, facilitating flattening of the pipes 2 and 4. Thus, even if the pipes 2 and 4 having large diameters are flattened by an external force other than earthquakes, the extrusion force F2 proportionate to the extrusion force F1 is generated in the radial direction A of the bulb part 18 by the self-seal effect as in the case of the earthquake, thereby improving the watertightness.

Second Embodiment

Figure 9:
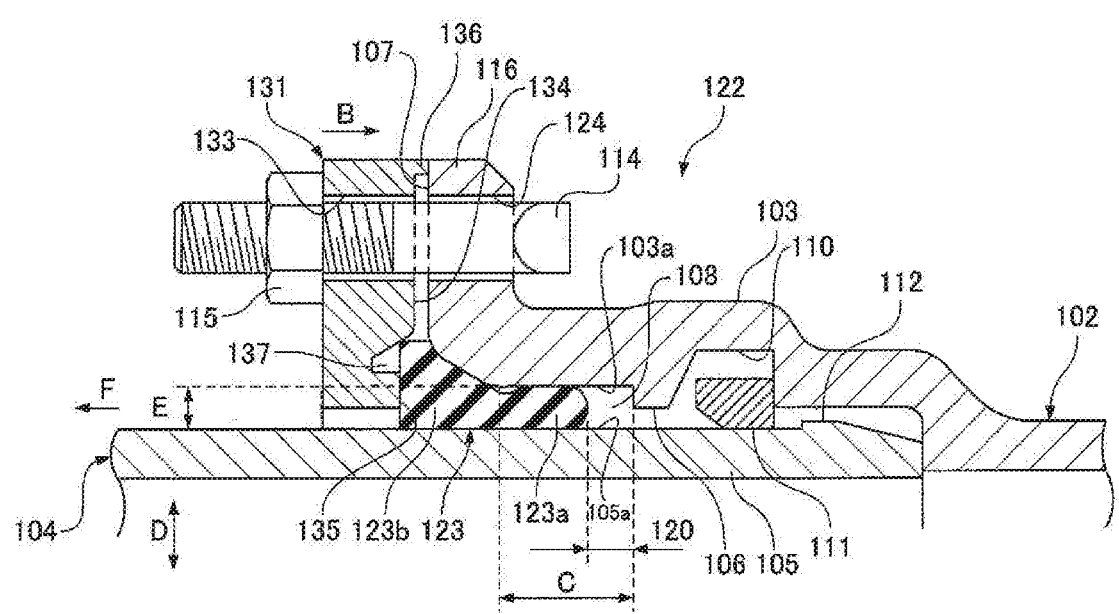
FIG. 9 is a cross-sectional view showing the structure of a joint of pipes with a pressing ring according to a second embodiment of the present invention.
Figure 10:
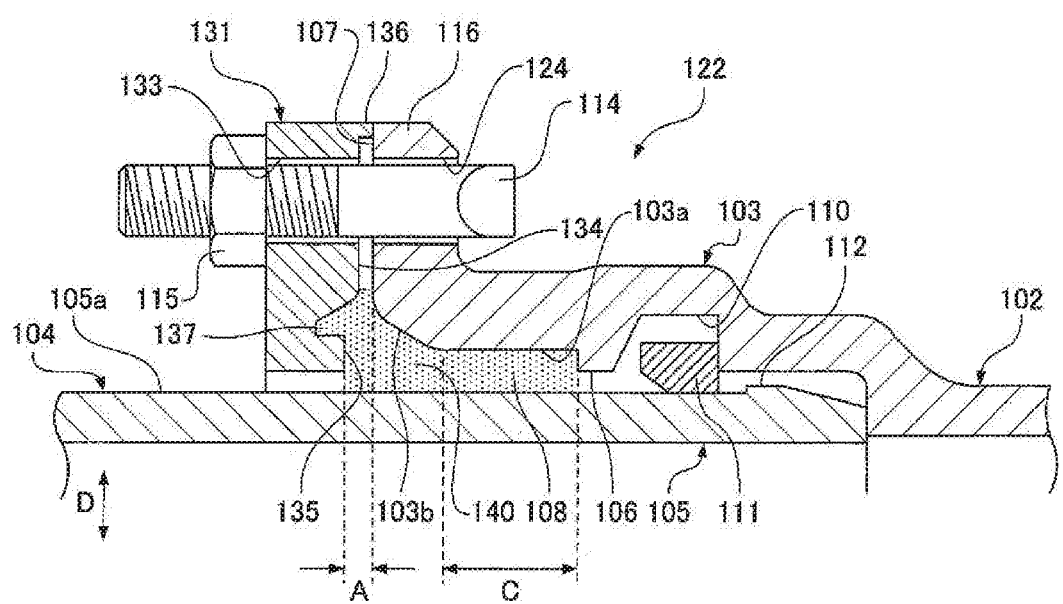
FIG. 10 is a cross-sectional view in which a sealing member is deleted from the joint

As shown in FIGS. 9 and 10, a joint 122 in a second embodiment is a pipe joint that joins a first pipe 102 (an example of a first passage forming member) and a second pipe 104 (an example of a second passage forming member). In the joint 122, a spigot 105 formed on the end of the second pipe 104 lies in a socket 103 formed on the end of the first pipe 102 to be joined to the second pipe 104. A peripheral wall 106 protruding inward in a radial direction is formed all around the inner circumference of the rear of the socket 103.

Moreover, between an opening end face 107 and the peripheral wall 106 of the socket 103, a sealing member insertion space 108 is formed between an outer circumference 105a of the spigot 105 and an inner circumference 103a of the socket 103 so as to surround the spigot 105. An annular sealing member 123 lies in the sealing member insertion space 108 so as to seal a space between the outer circumference 105a of the spigot 105 and the inner circumference 103a of the socket 103.

In the sealing member insertion space 108, a region where the inner circumference 103a of the socket 103 and the outer circumference 105a of the spigot 105 are opposed in parallel to each other is defined as a compressed region C. The inner circumference 103a of the socket 103 has a tapered part 103b between the opening end face 107 and the compressed region C. The tapered part 103b increases in diameter from the rear of the socket 103 to the opening end face 107.

Furthermore, behind the peripheral wall 106, a lock ring groove 110 is formed all around the inner circumference of the socket 103. A lock ring 111 having one slit in its circumference is attached to the lock ring groove 110. Furthermore, the spigot 105 has a protrusion 112 around the outer circumference of the end of the spigot 105 such that the protrusion 112 can be engaged with the lock ring 111 from the rear of the socket.

A pressing ring 131 that presses the sealing member 123 to the rear of the socket 103 is fit onto the spigot 105 and is opposed to the opening end face 107 of the socket 103 from the outside.

Figure 11:
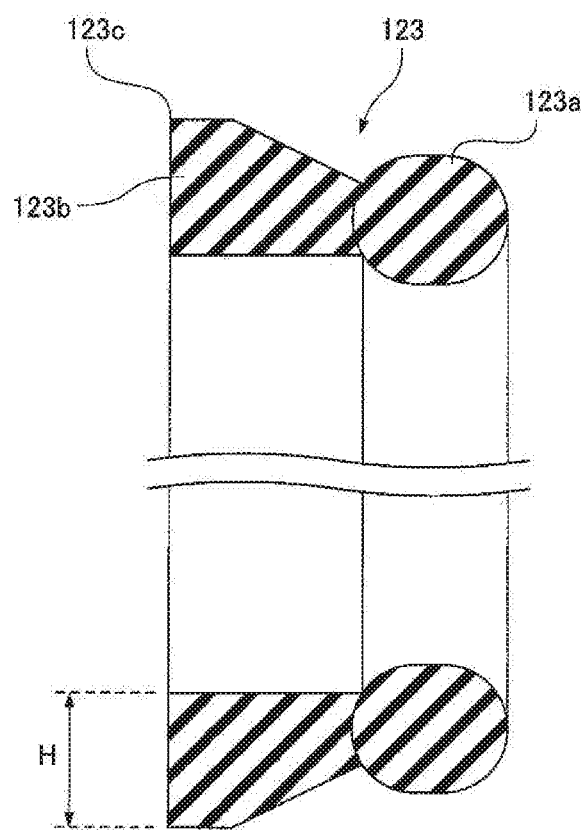
FIG. 11 is a cross-sectional view of the unattached sealing member alone to be provided in the joint.

As shown in FIG. 11, the sealing member 123 is an annular member made of an elastic material such as rubber. The sealing member 123 in cross section is a combination of a circular end 123a that is circularly formed at the insertion end of the sealing member 123 and a trapezoidal base portion 123b that decreases in thickness toward the circular end 123a and increases in thickness toward the pressing ring 131.

Figure 12:
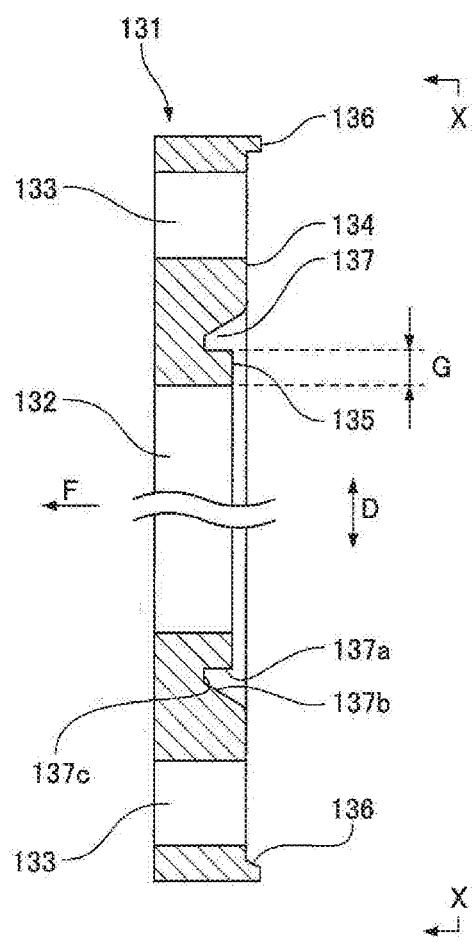
FIG. 12 is a cross-sectional view of the pressing ring of the joint.
Figure 13:
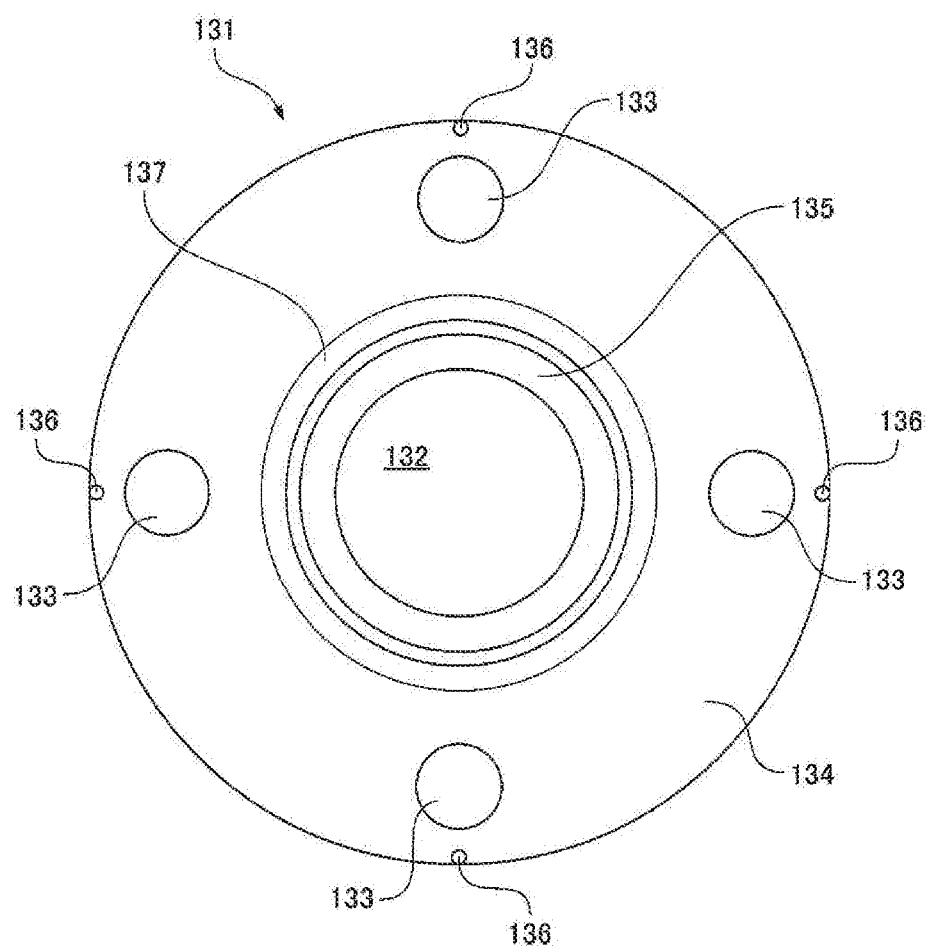
FIG. 13 is a cross-sectional view taken along the line X-X of FIG. 12.

As shown in FIGS. 9, 12, and 13, the pressing ring 131 is fastened to a flange 116 of the socket 103 with a plurality of T-head bolts 114 (an example of a pressing member) and nuts 115 (an example of a pressing member) so as to move along a tube axis 119 (See FIG. 16) in a pressing direction B.

The pressing ring 131 has a central opening 132 where the spigot 105 is inserted, a plurality of bolt insertion holes 133, a pressing-ring end face 134 opposed to the opening end face 107 of the socket 103, a pressing face 135 that comes into contact with the end face of the base portion 123b of the sealing member 123 so as to press the sealing member 123, a plurality of protrusions 136 (an example of a contact portion) that come into contact with the opening end face 107 of the socket 103 so as to keep a distance A (See FIG. 10) from the pressing face 135 to the opening end face 107 of the socket 103 at a predetermined distance, and an escaping portion 137 that allows escape of the base portion 123b of the sealing member 123 pressed by the pressing face 135.

The protrusions 136 are formed outside of the bolt insertion holes 133 in a radial direction D. The pressing face 135 is located inside of the pressing-ring end face 134 in a drawing direction F of the spigot 105 and is formed all within the inner periphery of the pressing-ring end face 134. This configuration forms a step in a tube axial direction between the pressing face 135 and the pressing-ring end face 134.

The escaping portion 137 is a recessed portion (grooved portion) that is opened near the opening end face 107 of the socket 103 opposed to the escaping portion 137. The escaping portion 137 is circumferentially formed so as to be located outside of the pressing face 135 in the radial direction D and between the pressing face 135 and the pressing-ring end face 134 in the radial direction D. The escaping portion 137 is recessed from the pressing face 135 in the drawing direction F of the spigot 105.

The escaping portion 137 has an inner side-wall face 137a, an outer side-wall face 137b, and a rear face 137c. The inner side-wall face 137a and the outer side-wall face 137b are opposed to each other in the radial direction D, and the rear face 137c is formed between the rear end of the inner side-wall face 137a and the rear end of the outer side-wall face 137b. The outer side-wall face 137b is an example of a centering portion that guides the pressing ring 131 in the radial direction D so as to align the center of the pressing ring 131 with the tube axis 119 (See FIG. 16, an example of the axis of the passage forming member). The outer side-wall face 137b decreases in diameter toward the rear of the escaping portion 137.

A width G of the pressing face 135 in the radial direction D in FIG. 12 is set at about 30% to 70% of a width H of the base portion 123b of the sealing member 123 in FIG. 11. The width G of the pressing face 135 is expressed by the following equation: the width G=(the outside diameter of the pressing face 135–the inside diameter of the pressing face 135)/2. The width H of the base portion 123b of the sealing member 123 is expressed by the following equation: the width H=(the outside diameter of the base portion 123b–the inside diameter of the base portion 123b)/2.

The operations of the configuration will be described below.

Figure 14:
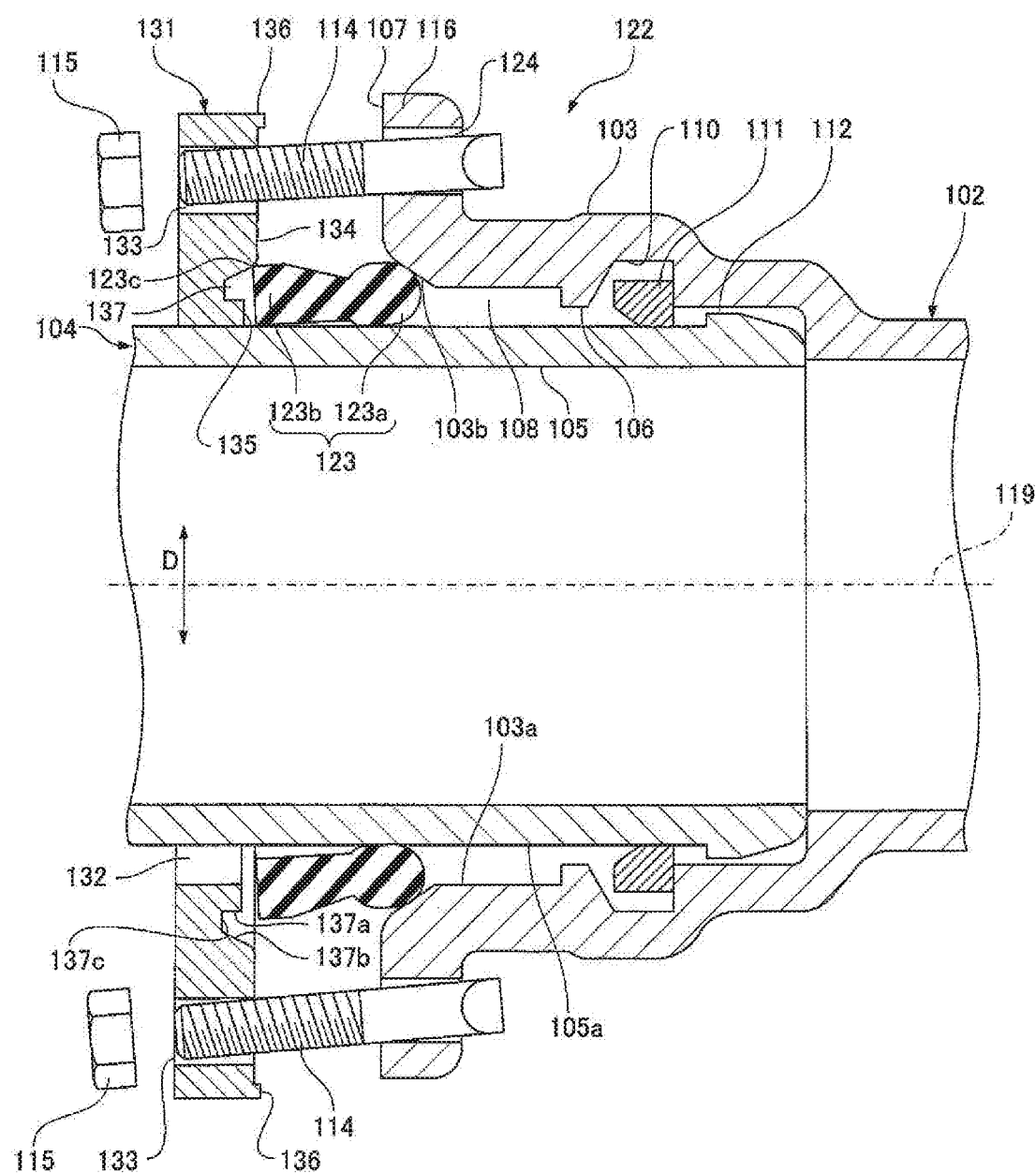
FIG. 14 is a cross-sectional view showing a step of mounting the pressing ring of the joint.

When the pipes 102 and 104 are joined, as shown in FIG. 14, the lock ring 111 is first fit into the lock ring groove 110 in the socket 103, and then the sealing member 123 and the pressing ring 131 are fit onto the spigot 105. In this state, the spigot 105 is inserted into the socket 103 until the protrusion 112 of the spigot 105 inside the lock ring 111 reaches the rear of the socket 103.

After that, the circular end 123a of the sealing member 123 is brought into contact with the tapered part 103b of the socket 103, and then the T-head bolts 114 are inserted into bolt through holes 124 of the flange 116 of the socket 103 and the bolt insertion holes 133 of the pressing ring 131. At this point, the pressing ring 131 is moved down by the self weight and thus the center of the pressing ring 131 is located under the tube axis 119. A clearance between the inner periphery of the pressing ring 131 and the outer periphery of the spigot 105 in the radial direction D is minimized (=0) at the upper end and is maximized at the lower end.

Figure 15:
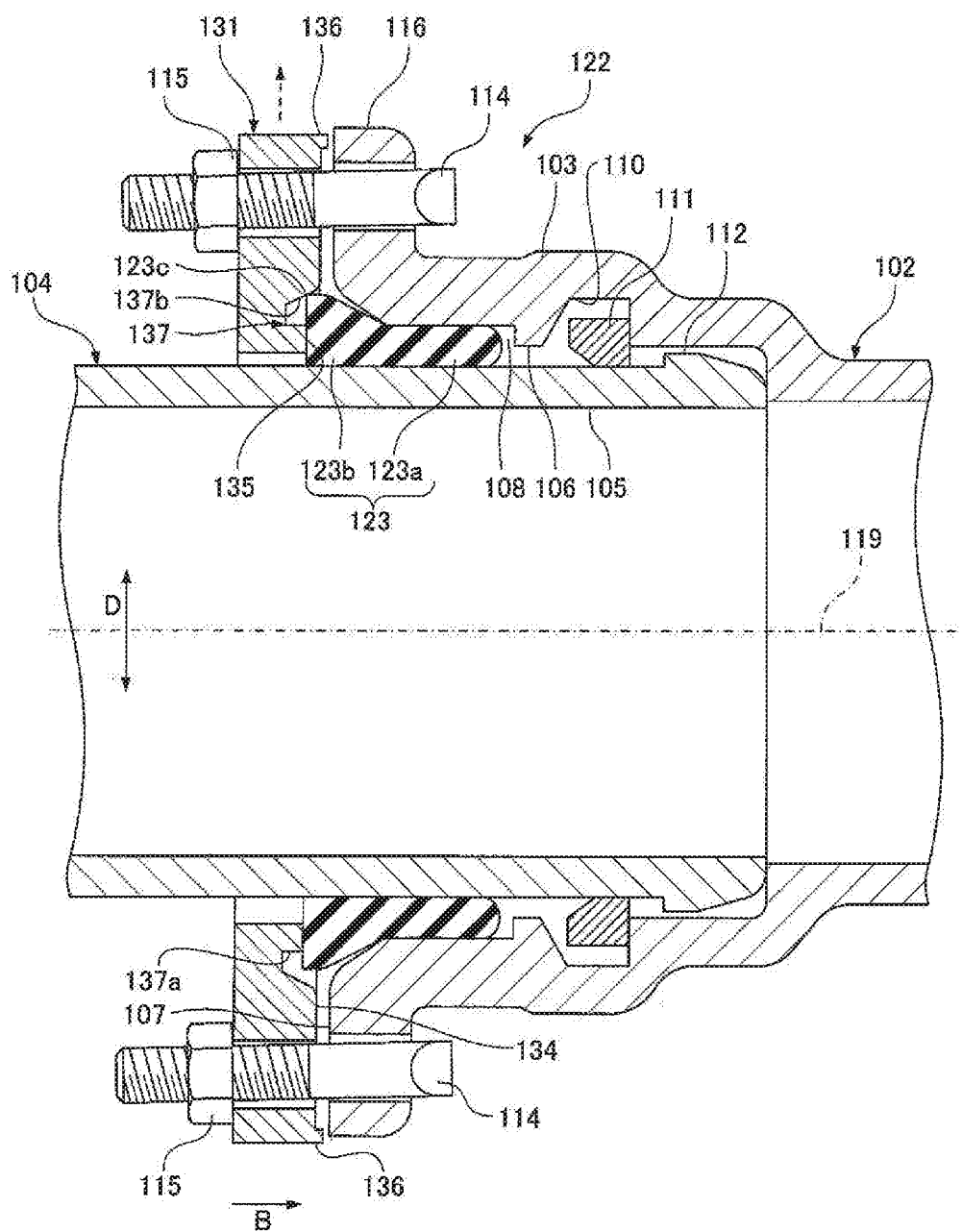
FIG. 15 is a cross-sectional view showing a step of mounting the pressing ring of the joint.

After that, as shown in FIG. 15, the nuts 115 are screwed onto the T-head bolts 114 so as to move the pressing ring 131 in the pressing direction B. Thus, the pressing face 135 of the pressing ring 131 comes into contact with the end face of the base portion 123b of the sealing member 123 so as to press the sealing member 123 in the pressing direction B. This presses the sealing member 123 into the sealing member insertion space 108. At this point, the outer side-wall face 137b of the escaping portion 137 is in sliding contact with an outer end corner 123c of the base portion 123b of the sealing member 123. Thus, the pressing ring 131 is guided in the radial direction D so as to climb up with respect to the spigot 105. This moves the center of the pressing ring 131 upward to the tube axis 119 so as to automatically center the pressing ring 131. Hence, an operator does not need to lift the pressing ring 131 in the radial direction D when centering the pressing ring 131.

Figure 16:
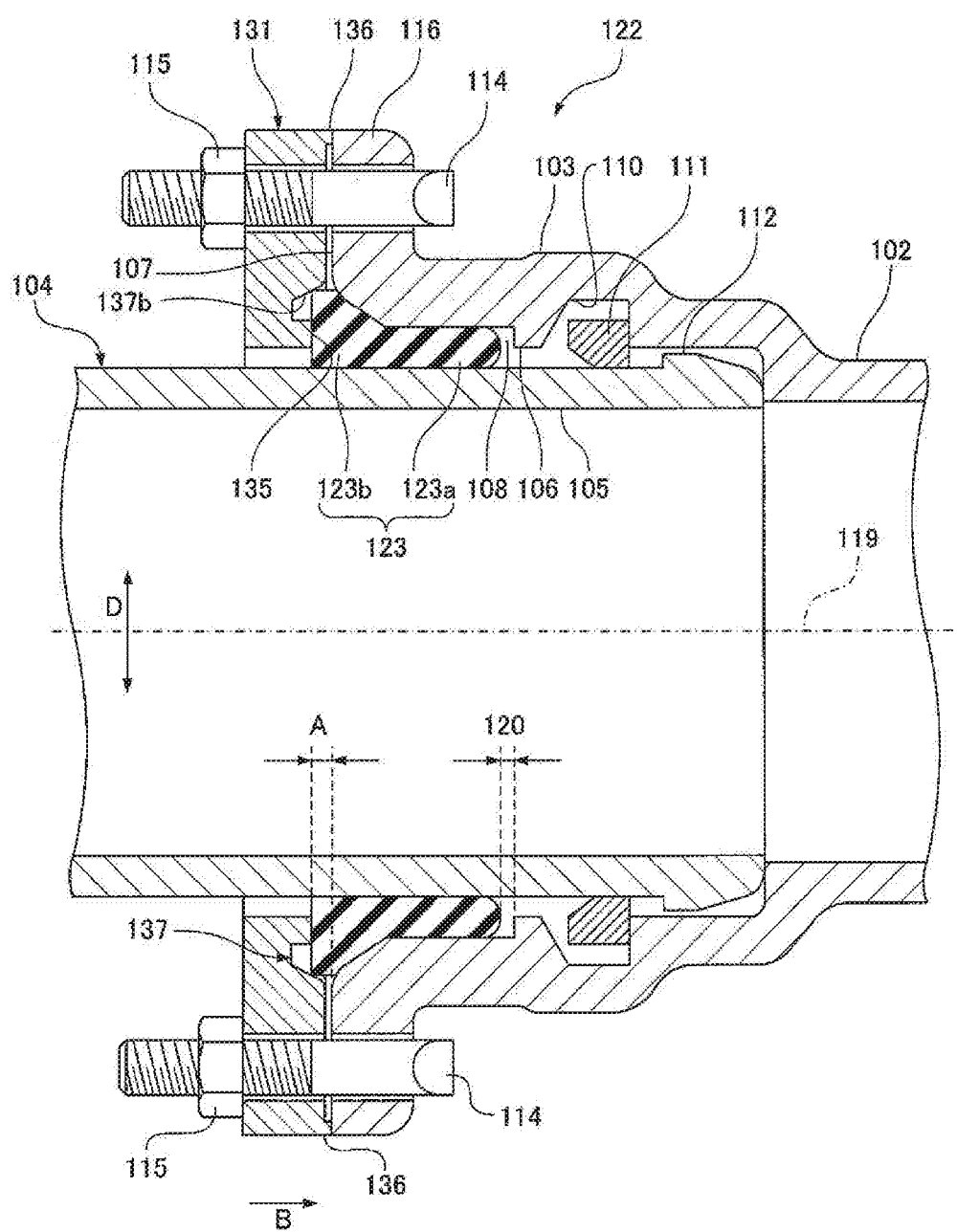
FIG. 16 is a cross-sectional view showing a step of mounting the pressing ring of the joint.

Subsequently, as shown in FIG. 16, the protrusions 136 of the pressing ring 131 come into contact with the opening end face 107 of the socket 103 so as to prevent the pressing ring 131 from moving in the pressing direction B. The fastening of the nuts 115 is stopped at this point so as to keep the distance A from the pressing face 135 of the pressing ring 131 to the opening end face 107 of the socket 103 at the predetermined distance. At this point, the rear end of the sealing member 123 does not reach the peripheral wall 106, forming a small space 120 between the rear end of the sealing member 123 and the peripheral wall 106.

As shown in FIG. 9, the circular end 123a of the sealing member 123 is compressed in the radial direction D in the compressed region C, thereby keeping watertightness between the inner circumference 103a of the socket 103 and the outer circumference 105a of the spigot 105.

Figure 17:
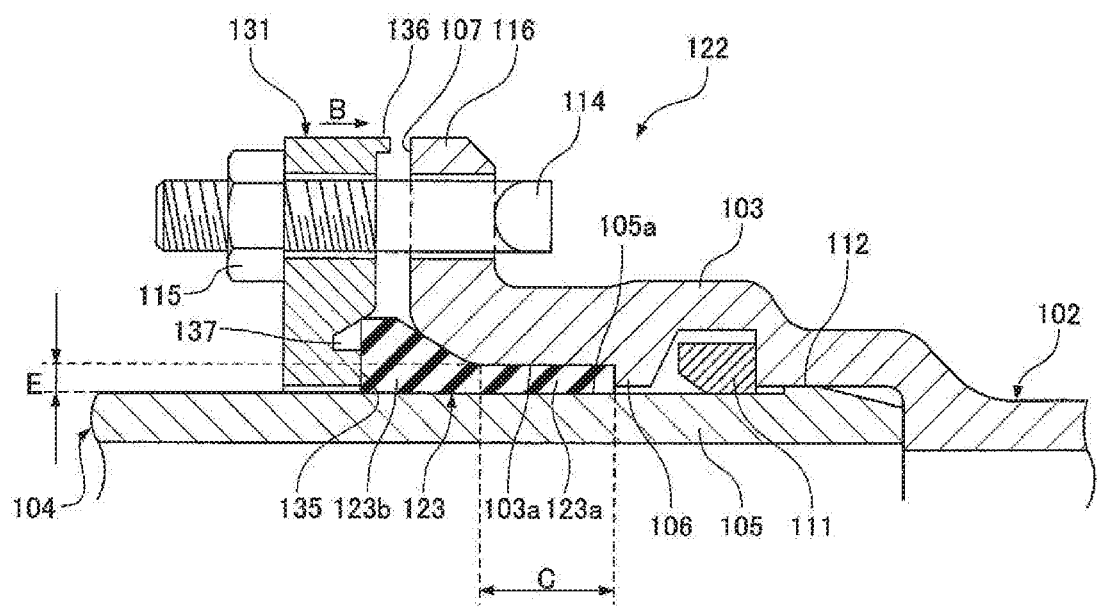
FIG. 17 is a cross-sectional view showing a state of the process in the midst of mounting the pressing ring of the joint with a small clearance between the socket and the spigot.
Figure 18:
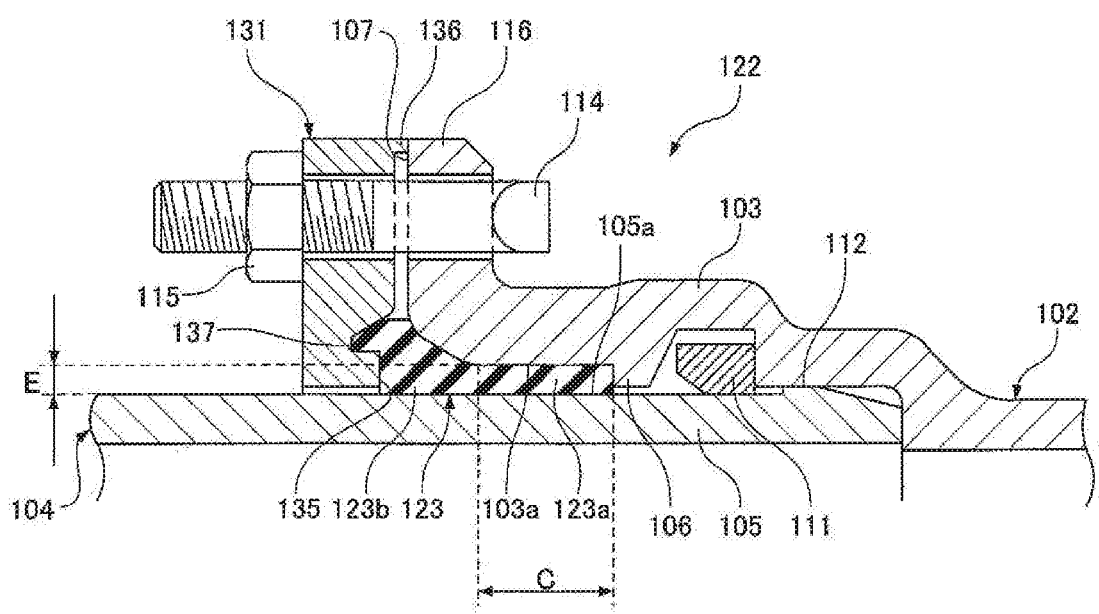
FIG. 18 is a cross-sectional view showing a state after the pressing ring of the joint is mounted with the small clearance between the socket and the spigot.

The joint 122 shown in FIGS. 9 and 16 has a sufficient clearance E between the inner circumference 103a of the socket 103 and the outer circumference 105a of the spigot 105. As shown in FIG. 17, if a manufacturing tolerance reduces the clearance E, the rear end of the sealing member 123 reaches the peripheral wall 106 before the protrusions 136 of the pressing ring 131 come into contact with the opening end face 107 of the socket 103. Thus, the sealing member 123 may not be pressed into the sealing member insertion space 108 any more. Even in this case, the nuts 115 are further fastened to move the pressing ring 131 in the pressing direction B, allowing the end of the base portion 123b of the sealing member 123 pressed by the pressing face 135 of the pressing ring 131 to enter the escaping portion 137 as shown in FIG. 18.

The sealing member 123 that cannot be pressed any more finally escapes into the escaping portion 137, smoothly bringing the protrusions 136 of the pressing ring 131 into contact with the opening end face 107 of the socket 103. This can smoothly join the pipes 102 and 104 and suppress extension of the socket 103 without applying an extremely large force (excessive force) to the sealing member 123 and the pressing ring 131. Thus, an increase in cost can be suppressed.

As indicated by a dotted part of FIG. 10, if a predetermined gap region 140 surrounded by the pressing face 135, the escaping portion 137 of the pressing ring 131, the inner circumference 103a of the socket 103, the outer circumference 105a of the spigot 105, and the peripheral wall 106 has a volume V1 while the sealing member 123 has a volume V2, the size of the escaping portion 137 is set such that the volume V1 of the predetermined gap region 140 is not smaller than the volume V2 of the sealing member 123 (that is, V1≥V2).

The volume V1 is determined by multiplying the cross-sectional area of the gap region 140 by the circumference of the centroid of the gap region 140. The volume V2 is determined by multiplying the cross-sectional area of the sealing member 123 by the circumference of the centroid of the sealing member 123.

Moreover, the width G (See FIG. 12) of the pressing face 135 is set at about 30% to 70% of the width H (See FIG. 11) of the base portion 123b of the sealing member 123. If the width G is set smaller than about 30% of the width H, the end face of the base portion 123b of the sealing member 123 may receive an extremely small force from the pressing face 135 of the pressing ring 131. Thus, the pressing face 135 may press the sealing member 123 with an insufficient force in the pressing direction B.

If the width G is set larger than about 70% of the width H, the outside diameter of the pressing face 135 of the pressing ring 131 increases, the outside diameter of the escaping portion 137 remains constant, and the inside diameter of the escaping portion 137 increases. This reduces the volume (internal capacity) of the escaping portion 137. In the case of the small clearance E, the sealing member 123 may insufficiently escape into the escaping portion 137, leading to difficulty in bringing the protrusions 136 of the pressing ring 131 into contact with the opening end face 107 of the socket 103.

Third Embodiment

Figure 19:
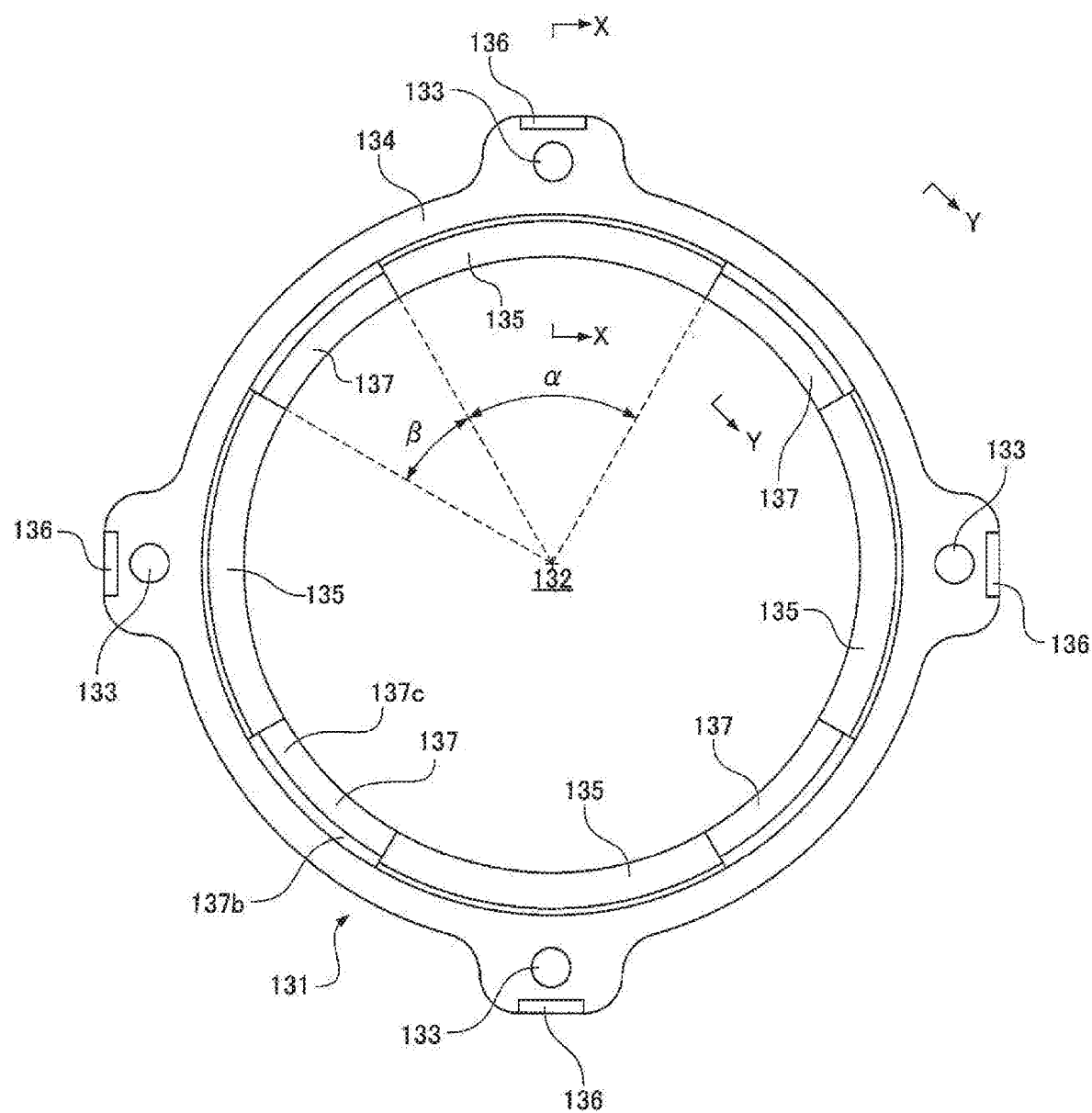
FIG. 19 is a front view of a pressing ring according to a third embodiment of the present invention.
Figure 20:
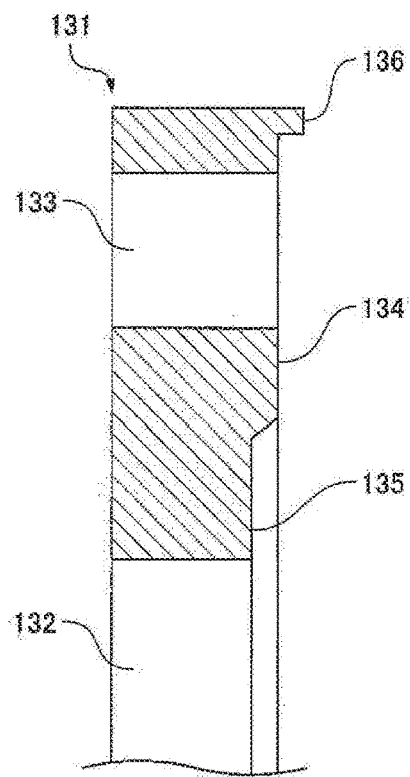
FIG. 20 is a cross-sectional view taken along the line X-X of FIG. 19.
Figure 21:
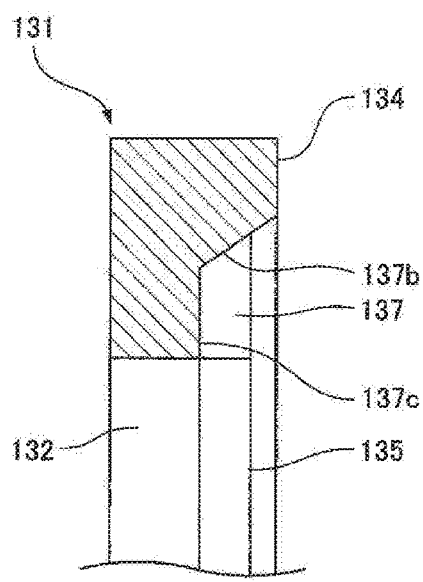
FIG. 21 is a cross-sectional view taken along the line Y-Y of FIG. 19.

In the second embodiment, as shown in FIG. 13, the pressing face 135 and the escaping portion 137 are formed all around the pressing ring 131. In the following third embodiment, as shown in FIGS. 19 to 21, pressing faces 135 and escaping portions 137 are divided into sections in the circumferential direction of a pressing ring 131.

Specifically, the pressing faces 135 are formed at four locations spaced 90° apart in the circumferential direction of the pressing ring 131, the pressing face 135 having a predetermined angle α. The escaping portions 137 are formed between the pressing faces 135 in the circumferential direction of the pressing ring 131, the escaping portion 137 having a predetermined angle β. As shown in FIG. 21, the escaping portion 137 has an outer side-wall face 137b and a rear face 137c. The inner periphery of the escaping portion 137 communicates with a central opening 132 of the pressing ring 131. As in the second embodiment, the outer side-wall face 137b is an example of a centering portion that guides the pressing ring 131 in a radial direction D and inclines to decrease in diameter toward the rear of the escaping portion 137.

The operations of the configuration will be described below.

Figure 22:
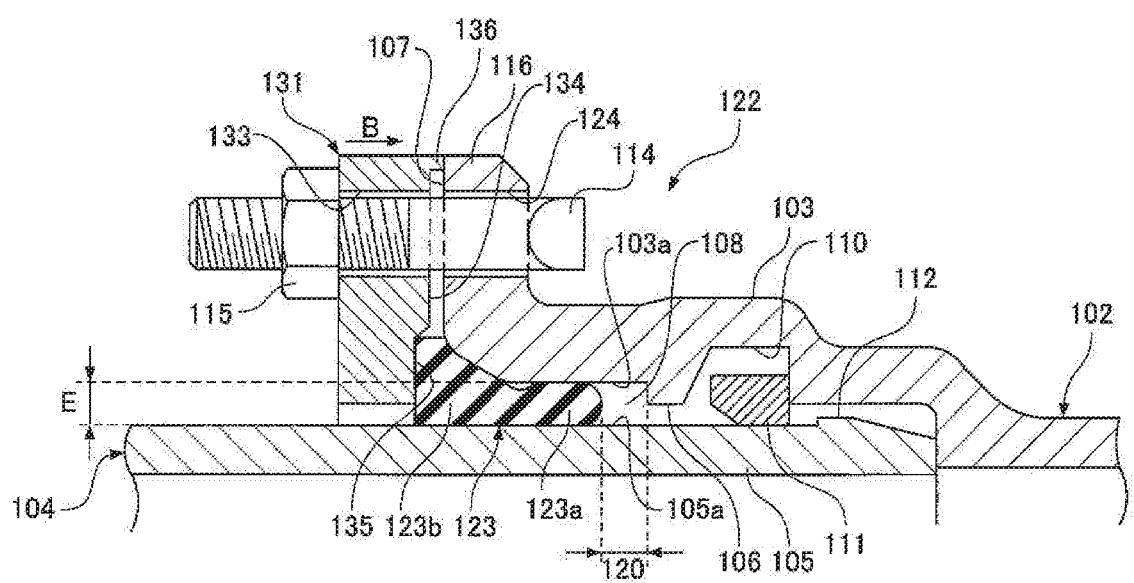
FIG. 22 is a cross-sectional view showing a joint at a point of the pressing face of the pressing ring.
Figure 23:
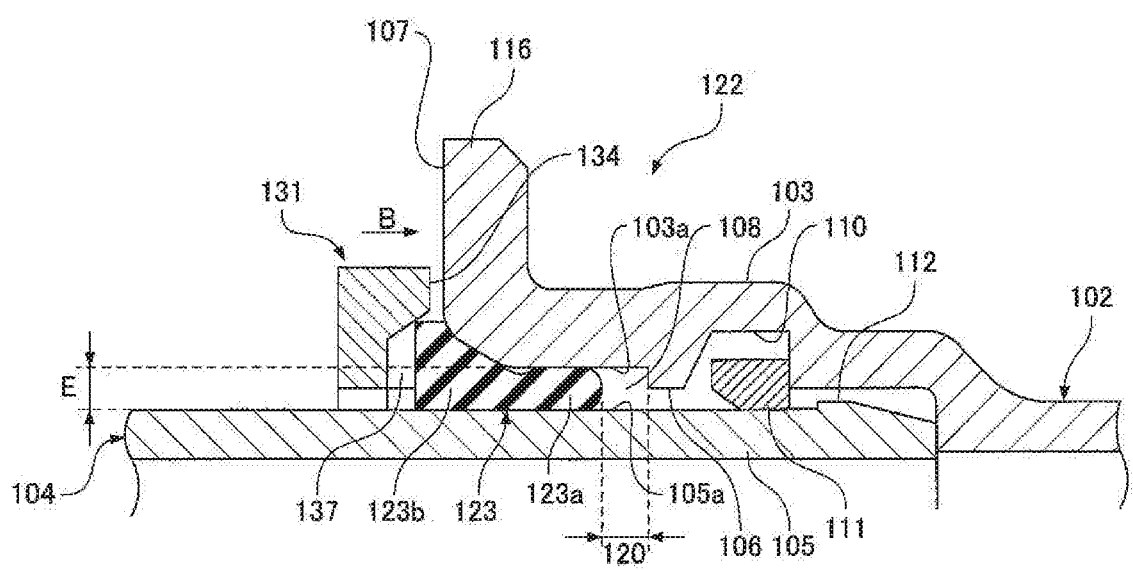
FIG. 23 is a cross-sectional view showing the joint at a point of the escaping portion of the pressing ring.

As shown in FIGS. 22 and 23, protrusions 136 of the pressing ring 131 come into contact with an opening end face 107 of a socket 103 so as to prevent the pressing ring 131 from moving in a pressing direction B. The fastening of nuts 115 is stopped at this point so as to keep a distance A from the pressing face 135 of the pressing ring 131 to the opening end face 107 of the socket 103 at a predetermined distance. At this point, the rear end of a sealing member 123 does not reach a peripheral wall 106, forming a small space 120 between the rear end of the sealing member 123 and the peripheral wall 106.

Figure 24:
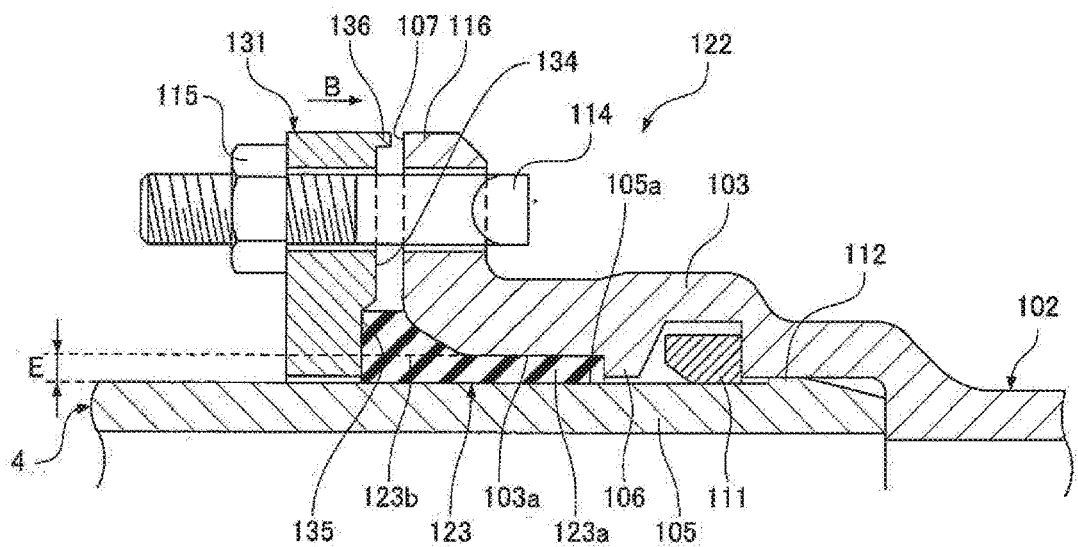
FIG. 24 is a cross-sectional view showing a state of the process in the midst of mounting the pressing ring with a small clearance between a socket and a spigot.
Figure 25:
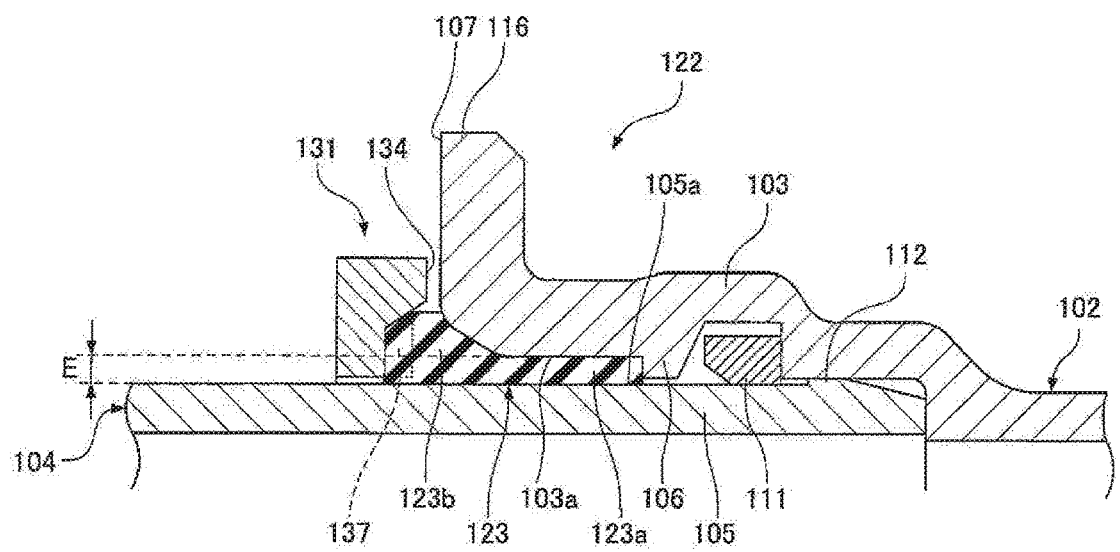
FIG. 25 is a cross-sectional view showing a state after the pressing ring is mounted with the small clearance between the socket and the spigot.

A joint 122 shown in FIGS. 22 and 23 has a sufficiently large clearance E between an inner circumference 103a of the socket 103 and an outer circumference 105a of a spigot 105. As shown in FIG. 24, in contrast, if a manufacturing tolerance reduces the clearance E, the rear end of the sealing member 123 reaches the peripheral wall 106 before the protrusions 136 of the pressing ring 131 come into contact with the opening end face 107 of the socket 103. Thus, the sealing member 123 may not be pressed into a sealing member insertion space 108 any more. Even in this case, the nuts 115 are further fastened to move the pressing ring 131 in the pressing direction B, allowing the end of a base portion 123b of the sealing member 123 to enter the escaping portion 137 as shown in FIG. 25.

The sealing member 123 that cannot be pressed any more finally escapes into the escaping portion 137 so as to smoothly bring the protrusions 136 of the pressing ring 131 into contact with the opening end face 107 of the socket 103. This can smoothly join pipes 102 and 104 and suppress extension of the socket 103 without applying an extremely large force (excessive force) to the sealing member 123 and the pressing ring 131. Thus, an increase in cost can be suppressed.

As in the second embodiment, when the pipes 102 and 104 are joined to each other, the outer side-wall face 137b of the escaping portion 137 is in sliding contact with an outer end corner 123c of the base portion 123b of the sealing member 123. Thus, the pressing ring 131 is guided in the radial direction D so as to be automatically centered. This does not require an operator to lift the pressing ring 131 in the radial direction D when centering the pressing ring 131.

In the third embodiment, as shown in FIG. 19, the pressing ring 131 has the four pressing faces 135 and the four escaping portions 137. The number of locations is not limited to four.

In the second and third embodiments, as shown in FIGS. 9 and 22, the first pipe 102 was described as an example of a first passage forming member, the second pipe 104 was described as an example of a second passage forming member, and a pipe joint was described as the joint 122. The joint 122 is not limited to a joint for the pipes 102 and 104. For example, as will be described in a fourth embodiment that will be described below, a joint may be provided to join a valve and a pipe.

Fourth Embodiment

Figure 26:
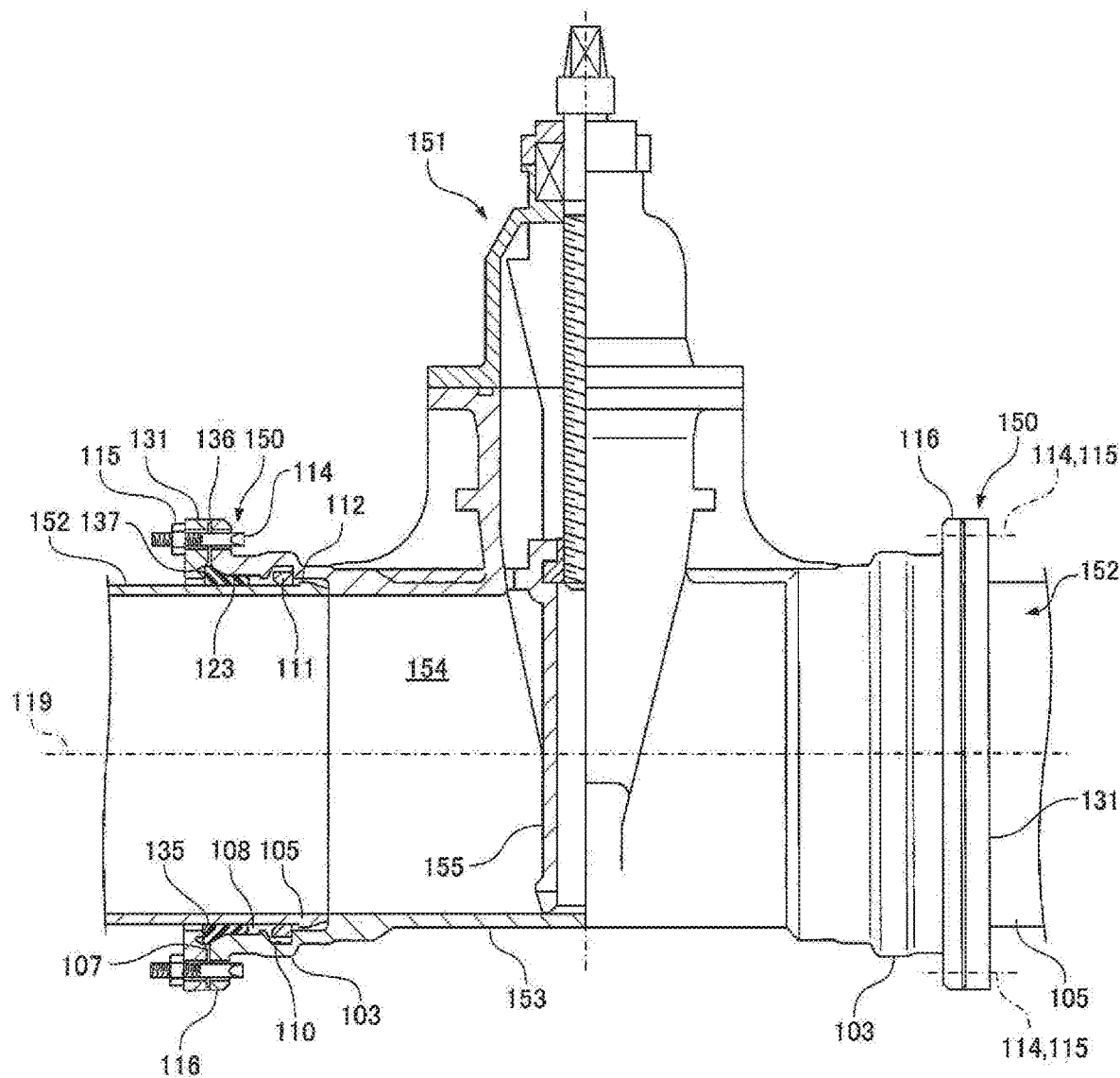
FIG. 26 is a cross-sectional view showing the structure of a joint of a pipe and a valve with a pressing ring according to a fourth embodiment of the present invention.

As shown in FIG. 26, a joint 150 in a fourth embodiment joins a soft-seal gate valve 151 (an example of a first passage forming member) and a pipe 152 (an example of a second passage forming member). The soft-seal gate valve 151 includes a valve casing 153 and a valve body 155 that opens and closes a passage 154 formed in the valve casing 153.

The valve casing 153 has a pair of sockets 103 that serve as the inlet and outlet of a fluid. A spigot 105 is provided on one end of the pipe 152. The spigot 105 lying in the socket 103 constitutes the joint 150 including the gate valve 151 and the pipe 152. The structure of the joint 150 is identical to that of the joint 122 according to the second or third embodiment, and thus the detailed explanation thereof is omitted.

With this configuration, the same operations and effect can be obtained as in the second or third embodiment. Protrusions 136 of a pressing ring 131 are brought into contact with an opening end face 107 of the socket 103 so as to smoothly join the gate valve 151 and the pipe 152 and suppress extension of the socket 103. Thus, an increase in cost can be suppressed.

In the fourth embodiment, as shown in FIG. 26, the gate valve 151 was described as an example of the first passage forming member. Other kinds of valves other than the gate valve are also applicable.

In the fourth embodiment, as shown in FIG. 26, the gate valve 151 was described as an example of the first passage forming member and the pipe 152 was described as an example of the second passage forming member. The pipe 152 may be an example of the first passage forming member and the gate valve 151 may be an example of the second passage forming member. In this case, the socket 103 is provided on the one end of the pipe 152 and a pair of spigots 105 is provided on the valve casing 153 of the gate valve 151.

Fifth Embodiment

Figure 27:
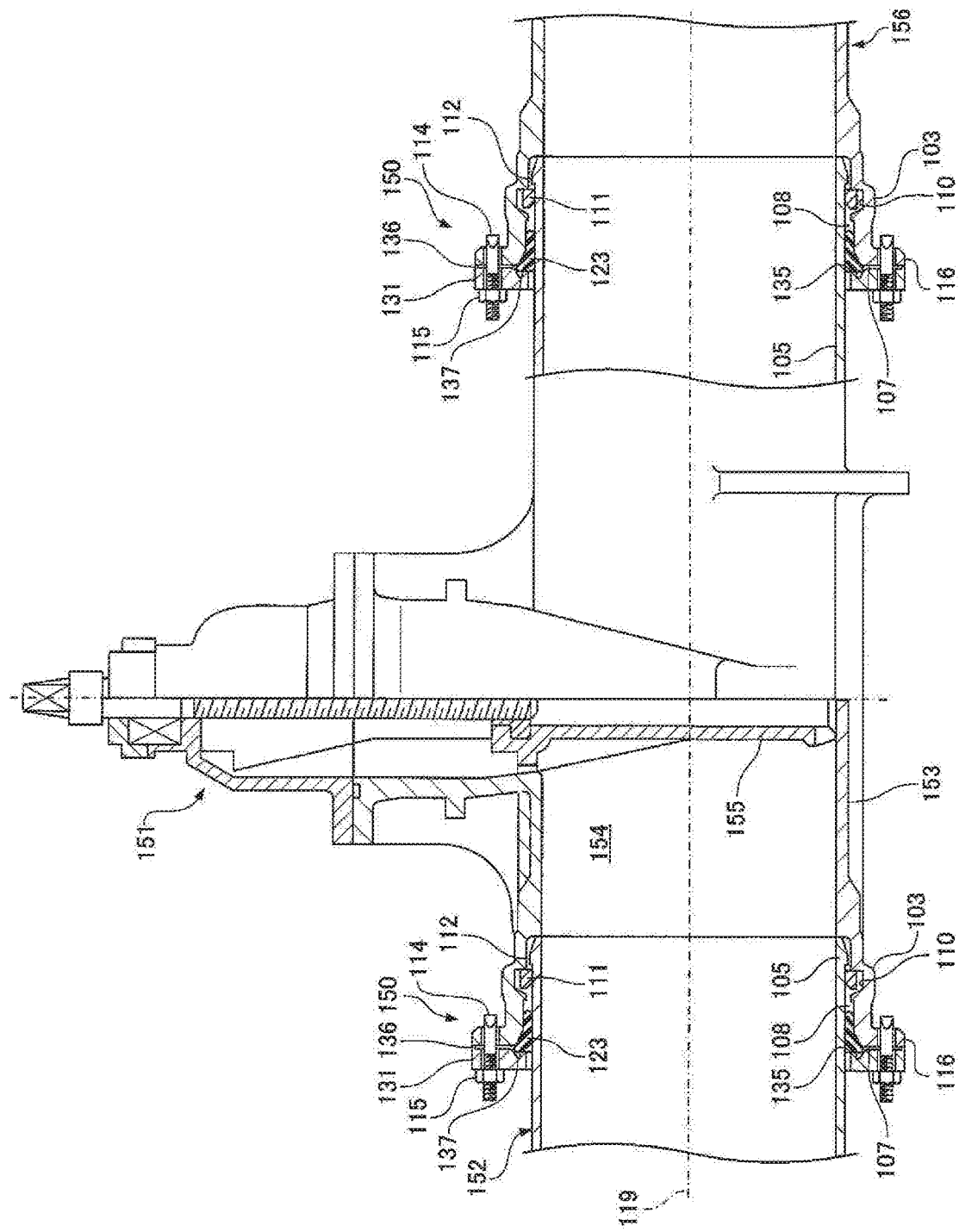
FIG. 27 is a cross-sectional view showing the structure of a joint of pipes and a valve with a pressing ring according to a fifth embodiment of the present invention.

In the fourth embodiment, as shown in FIG. 26, the valve casing 153 includes the pair of sockets 103. In a fifth embodiment that will be described below, as shown in FIG. 27, a valve casing 153 may have a socket 103 and a spigot 105. In this case, the spigot 105 of a pipe 152 is inserted into the socket 103 of a gate valve 151 so as to constitute a joint 150 while the spigot 105 of the gate valve 151 is inserted into the socket 103 of another pipe 156 so as to constitute a joint 150.

With this configuration, the same operations and effect can be obtained as in the fourth embodiment.

In the second to fifth embodiments, as shown in FIGS. 9, 22, 26, and 27, the pressing ring 131 includes the protrusions 136, an example of a contact portion. The protrusions may be provided on the opening end face 107 of the socket 103, and the pressing ring 131 may have contact portions on the protrusions of the socket 103.

Having described the invention, the following is claimed:

1. An annular sealing member made of an elastic material, the annular sealing member being configured to seal a joint between a socket formed on an end of a second pipe and a spigot formed on an end of a first pipe and positioned within the socket, a protrusion being formed on an outer radial circumference of the spigot at an end of the spigot, the spigot being positioned within the socket such that the protrusion is not in contact with the annular sealing member when the joint between the socket and the spigot is sealed by the annular sealing member, the annular sealing member comprising:

a heel part configured to fit into a fitting groove formed in an inner radial circumference of the socket; and a bulb part extending from the heel part, the bulb part being configured to fit between the inner radial circumference of the socket and the outer radial circumference of the spigot such that the bulb part is compressed in a radial direction to keep watertightness between the socket and the spigot, wherein, when the heel part is fitted into the fitting groove prior to the spigot being positioned within the socket:

a first projection of the bulb part is defined by an outer radial periphery of the bulb part and protrudes outward in a radial direction away from a center axis of the second pipe;

a third projection of the bulb part is defined by an inner radial periphery of the bulb part, protrudes inward in the radial direction toward the center axis of the second pipe, and, apart from the protrusion, has a diameter that is smaller than an outer diameter of the spigot;

a second projection of the bulb part is defined by a periphery of the bulb part extending between the first projection and the third projection and away from an opening of the socket, the second projection having an outer radial periphery extending away from the center axis of the second pipe and an inner radial periphery extending toward the center axis of the second pipe;

diameters of the inner and outer radial peripheries of the second projection are smaller than diameters of the inner and outer radial peripheries of the second projection when the joint between the socket and the spigot is sealed;

the first projection extends between an outer radial periphery of the heel part and the outer radial periphery of the second projection in an axial direction of the second pipe;

the third projection extends between an inner radial periphery of the heel part and the inner radial periphery of the second projection in the axial direction of the second pipe, the third projection continuously decreasing in diameter from the inner radial periphery of the heel part to the inner radial periphery of the second projection, the diameter of the third projection being larger than a diameter at the inner radial periphery of the second projection;

a first distance is defined between the first projection to the third projection along a second inclination direction that is perpendicular to a first inclination direction associated with the third projection; and a second distance is defined in the radial direction between an outer radial periphery of the first projection and the inner radial periphery of the second projection, the second distance being greater that the first distance.

2. The annular sealing member according to claim 1, wherein, when the heel part is fitted into the fitting groove prior to the spigot being positioned within the socket:

a first-second recess is formed between the first projection and the inner radial periphery of the second projection;

a second-third recess is formed between the outer radial periphery of the second projection and the third projection; and a third distance between the first-second recess and the second-third recess is greater than distance between the inner radial periphery of the second projection and the outer radial periphery of the second projection.

3. The annular sealing member according to claim 2, wherein a heel-first recess is formed between the outer radial periphery of the heel part and the first projection, and wherein a third-heel recess is formed between the third projection and the inner radial periphery of the heel part.

4. A joint, comprising:

a socket formed on an end of a second pipe;

a spigot formed on an end of a first pipe and positioned within the socket, a protrusion being formed on an outer radial circumference of the spigot at an end of the spigot; and an annular sealing member made of an elastic material, the annular sealing member being in contact with an inner radial circumference of the socket and the outer radial circumference of the spigot without being in contact with the protrusion of the spigot, the annular sealing member comprising:

a heel part fitted into a fitting groove formed in the inner radial circumference of the socket; and a bulb part extending from the heel part, the bulb part being fitted between the inner radial circumference of the socket and the outer radial circumference of the spigot without being in contact with the protrusion of the spigot such that the bulb part is compressed in a radial direction to keep watertightness between the socket and the spigot, wherein, before the spigot is positioned within or inserted into the socket:

a first projection of the bulb part is defined by an outer radial periphery of the bulb part and protrudes outward in the radial direction away from a center axis of the second pipe;

a third projection of the bulb part is defined by an inner radial periphery of the bulb part, the third projection protruding inward in the radial direction toward the center axis of the second pipe and, apart from the protrusion, having a diameter that is smaller than an outer diameter of the spigot;

a second projection of the bulb part is defined by a periphery of the bulb part extending between the first projection and the third projection and away from an opening of the socket, the second projection having an outer radial periphery extending away from the center axis of the second pipe and an inner radial periphery extending toward the center axis of the second pipe;

diameters of the inner and outer radial peripheries of the second projection are smaller than diameters of the inner and outer radial peripheries of the second projection when the bulb part is in contact with an inner radial circumference of the socket and the outer radial circumference of the spigot without being in contact with the protrusion of the spigot;

the first projection extends between an outer radial periphery of the heel part and the outer radial periphery of the second projection in an axial direction of the second pipe;

the third projection extends between an inner radial periphery of the heel part and the inner radial periphery of the second projection in the axial direction of the second pipe, the third projection continuously decreasing in diameter from the inner radial periphery of the heel part to the inner radial periphery of the second projection, the diameter of the third projection being larger than a diameter at the inner radial periphery of the second projection;

a first distance is defined between the first projection to the third projection along a second inclination direction that is perpendicular to a first inclination direction associated with the third projection; and a second distance is defined in the radial direction between an outer radial periphery of the first projection and the inner radial periphery of the second projection, the second distance between greater than the first distance.

5. The joint according to claim 4, wherein, when the protrusion of the spigot compresses the bulb part in the radial direction while contacting the third projection in a process of inserting the spigot into the socket, a positional relationship among the first, second, and third projections is shaped to resemble a triangle having an apex represented by the third projection in the radial direction.

6. The joint according to claim 4, wherein, before the spigot is positioned within or inserted into the socket:

a first-second recess is formed between the first projection and the inner radial periphery of the second projection;

a second-third recess is formed between the outer radial periphery of the second projection and the third projection; and a third distance between the first-second recess and the second-third recess is greater than distance between the inner radial periphery of the second projection and the outer radial periphery of the second projection.

7. The joint according to claim 6, wherein a heel-first recess is formed between the outer radial periphery of the heel part and the first projection, and wherein a third-heel recess is formed between the third projection and the inner radial periphery of the heel part.

* * * * *